United States Patent
Huang

(10) Patent No.: US 9,651,759 B2
(45) Date of Patent: May 16, 2017

(54) PHOTOGRAPHING LENS SYSTEM, IMAGE CAPTURING UNIT AND ELECTRONIC DEVICE

(71) Applicant: LARGAN Precision Co.,Ltd., Taichung (TW)

(72) Inventor: Hsin-Hsuan Huang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 0 days.

(21) Appl. No.: 14/952,287

(22) Filed: Nov. 25, 2015

(65) Prior Publication Data
US 2017/0082833 A1    Mar. 23, 2017

(30) Foreign Application Priority Data
Sep. 23, 2015  (TW) .............. 104131488 A

(51) Int. Cl.
*G02B 3/02* (2006.01)
*G02B 13/00* (2006.01)
*G02B 27/00* (2006.01)
*G02B 9/62* (2006.01)

(52) U.S. Cl.
CPC .......... *G02B 13/0045* (2013.01); *G02B 9/62* (2013.01); *G02B 27/0025* (2013.01)

(58) Field of Classification Search
CPC ................................. G02B 13/0045
USPC ........................................ 359/713
See application file for complete search history.

(56) References Cited

U.S. PATENT DOCUMENTS

| | | |
|---|---|---|
| 2014/0078603 A1 | 3/2014 | You |
| 2015/0029599 A1* | 1/2015 | Huang ............... G02B 3/04 359/713 |
| 2015/0070578 A1 | 3/2015 | Chen et al. |
| 2015/0070579 A1 | 3/2015 | Chen et al. |
| 2015/0116843 A1 | 4/2015 | Jo |
| 2016/0139366 A1 | 5/2016 | Jung |
| 2016/0139367 A1 | 5/2016 | Jung |

FOREIGN PATENT DOCUMENTS

| | | |
|---|---|---|
| JP | 2011085733 A | 4/2011 |
| JP | 2014010400 A | 1/2014 |
| TW | 201504669 A | 2/2015 |

(Continued)

*Primary Examiner* — James Jones
(74) *Attorney, Agent, or Firm* — Muncy, Geissler, Olds & Lowe, P.C.

(57) ABSTRACT

A photographing lens system includes, in order from an object side to an image side, a first lens element, a second lens element, a third lens element, a fourth lens element, a fifth lens element and a sixth lens element. The second lens element has positive refractive power. The third lens element has a concave image-side surface, wherein both object-side and image-side surfaces thereof are aspheric. The fourth lens element has a convex image-side surface, wherein both object-side and image-side surfaces thereof are aspheric. The fifth lens element has negative refractive power, wherein both object-side and image-side surfaces thereof are aspheric. The sixth lens element has a concave image-side surface, wherein both object-side and image-side surfaces thereof are aspheric, and at least one of the two surfaces thereof has at least one inflection point. The photographing lens system has a total of six lens elements.

27 Claims, 19 Drawing Sheets

(56) References Cited

FOREIGN PATENT DOCUMENTS

| TW | 201504670 A | 2/2015 |
|---|---|---|
| TW | 201520594 A | 6/2015 |
| TW | 201523062 A | 6/2015 |
| WO | WO 2014/013677 A1 | 1/2014 |
| WO | WO 2014/162779 A1 | 10/2014 |

\* cited by examiner

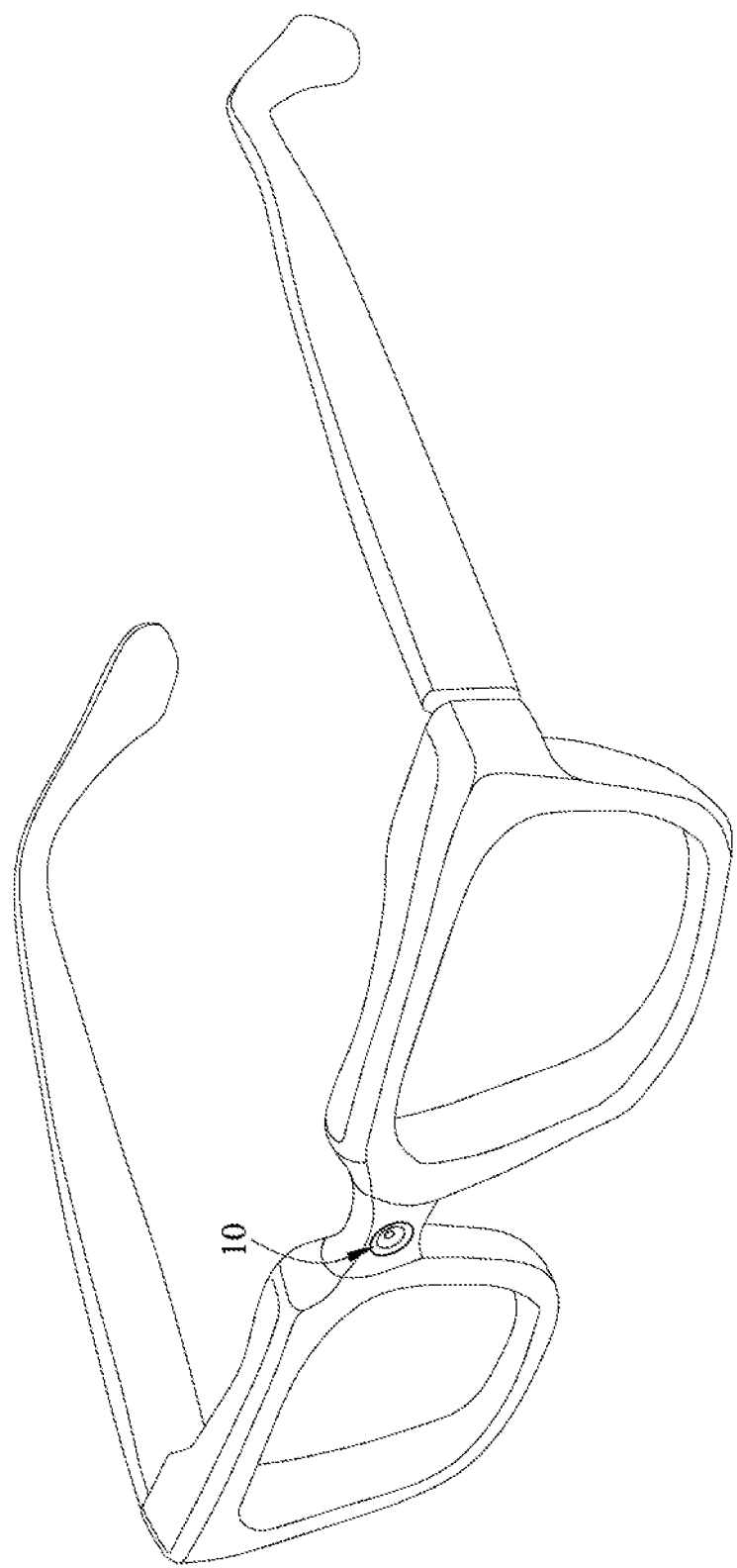

PHOTOGRAPHING LENS SYSTEM, IMAGE CAPTURING UNIT AND ELECTRONIC DEVICE

RELATED APPLICATIONS

This application claims priority to Taiwan Application 104131488, filed Sep. 23, 2015, which is incorporated by reference herein in its entirety.

BACKGROUND

Technical Field

The present disclosure relates to a photographing lens system, an image capturing unit and an electronic device, more particularly to a photographing lens system and an image capturing unit applicable to an electronic device.

Description of Related Art

In recent years, with the popularity of electronic devices having camera functionalities, the demand of miniaturized optical systems has been increasing. The sensor of a conventional optical system is typically a CCD (Charge-Coupled Device) or a CMOS (Complementary Metal-Oxide-Semiconductor) sensor. As the advanced semiconductor manufacturing technologies have reduced the pixel size of sensors, and compact optical systems have gradually evolved toward the field of higher megapixels, there is an increasing demand for compact optical systems featuring better image quality.

A conventional optical system employed in a portable electronic product mainly adopts a lens structure with fewer lens elements. Due to the popularity of mobile terminals with high-end specifications, such as smartphones, wearable devices and tablet personal computers, the requirements for high resolution and image quality increase significantly. However, the conventional optical system has a narrow field of view and insufficient capability for correcting aberrations, and therefore it is unable to provide desirable image quality. Thus, there is a need to develop an optical system featuring compact size, wide field of view and high image quality.

SUMMARY

According to one aspect of the present disclosure, a photographing lens system includes, in order from an object side to an image side, a first lens element, a second lens element, a third lens element, a fourth lens element, a fifth lens element and a sixth lens element. The second lens element has positive refractive power. The third lens element has an image-side surface being concave, wherein both an object-side surface and the image-side surface of the third lens element are aspheric. The fourth lens element has an image-side surface being convex, wherein both an object-side surface and the image-side surface of the fourth lens element are aspheric. The fifth lens element has negative refractive power, wherein both an object-side surface and an image-side surface of the fifth lens element are aspheric. The sixth lens element has an image-side surface being concave, wherein both an object-side surface and the image-side surface of the sixth lens element are aspheric, and at least one of the object-side surface and the image-side surface of the sixth lens element has at least one inflection point. The photographing lens system has a total of six lens elements. When a focal length of the photographing lens system is f, a focal length of the first lens element is f1, a focal length of the second lens element is f2, a curvature radius of an object-side surface of the first lens element is R1, the following conditions are satisfied:

$-0.60 < f/R1 < 0.80$; and $-0.50 < f2/f1 < 0.40$.

According to another aspect of the present disclosure, a photographing lens system includes, in order from an object side to an image side, a first lens element, a second lens element, a third lens element, a fourth lens element, a fifth lens element and a sixth lens element. The second lens element has positive refractive power. The third lens element has an object-side surface and an image-side surface being both aspheric. The fourth lens element has an object-side surface and an image-side surface being both aspheric. The fifth lens element with negative refractive power has an object-side surface being concave and an image-side surface being convex, wherein both the object-side surface and the image-side surface of the fifth lens element are aspheric. The sixth lens element has an image-side surface being concave, wherein both an object-side surface and the image-side surface of the sixth lens element are aspheric, and at least one of the object-side surface and the image-side surface of the sixth lens element has at least one inflection point. The photographing lens system has a total of six lens elements. When a focal length of the photographing lens system is f, a focal length of the first lens element is f1, a focal length of the second lens element is f2, a curvature radius of an object-side surface of the first lens element is R1, the following conditions are satisfied:

$-0.60 < f/R1 < 0.80$; and $-0.50 < f2/f1 < 0.40$.

According to still another aspect of the present disclosure, a photographing lens system includes, in order from an object side to an image side, a first lens element, a second lens element, a third lens element, a fourth lens element, a fifth lens element and a sixth lens element. The second lens element has positive refractive power. The third lens element has an image-side surface being concave, wherein both an object-side surface and the image-side surface of the third lens element are aspheric. The fourth lens element has an object-side surface and an image-side surface being both aspheric. The fifth lens element has negative refractive power, wherein both an object-side surface and an image-side surface of the fifth lens element are aspheric. The sixth lens element has an image-side surface being concave, wherein both an object-side surface and the image-side surface of the sixth lens element are aspheric, and at least one of the object-side surface and the image-side surface of the sixth lens element has at least one inflection point. The photographing lens system has a total of six lens elements. When a focal length of the photographing lens system is f, a focal length of the first lens element is f1, a focal length of the second lens element is f2, a curvature radius of an object-side surface of the first lens element is R1, a curvature radius of the object-side surface of the third lens element is R5, a curvature radius of the image-side surface of the third lens element is R6, and the following conditions are satisfied:

$-0.60 < f/R1 < 0.80$;

$-0.50 < f2/f1 < 0.40$; and $0 < (R5+R6)/(R5-R6)$.

According to yet still another aspect of the present disclosure, an image capturing unit includes the aforementioned photographing lens system and an image sensor, wherein the image sensor is disposed on the image side of the photographing lens system.

According to yet still another aspect of the present disclosure, an electronic device includes the aforementioned image capturing unit.

BRIEF DESCRIPTION OF THE DRAWINGS

The disclosure can be more understood by reading the following detailed description of the embodiments, with reference made to the accompanying drawings as follows:

FIG. 19 shows an electronic device according to still another embodiment.

DETAILED DESCRIPTION

Figure 1:
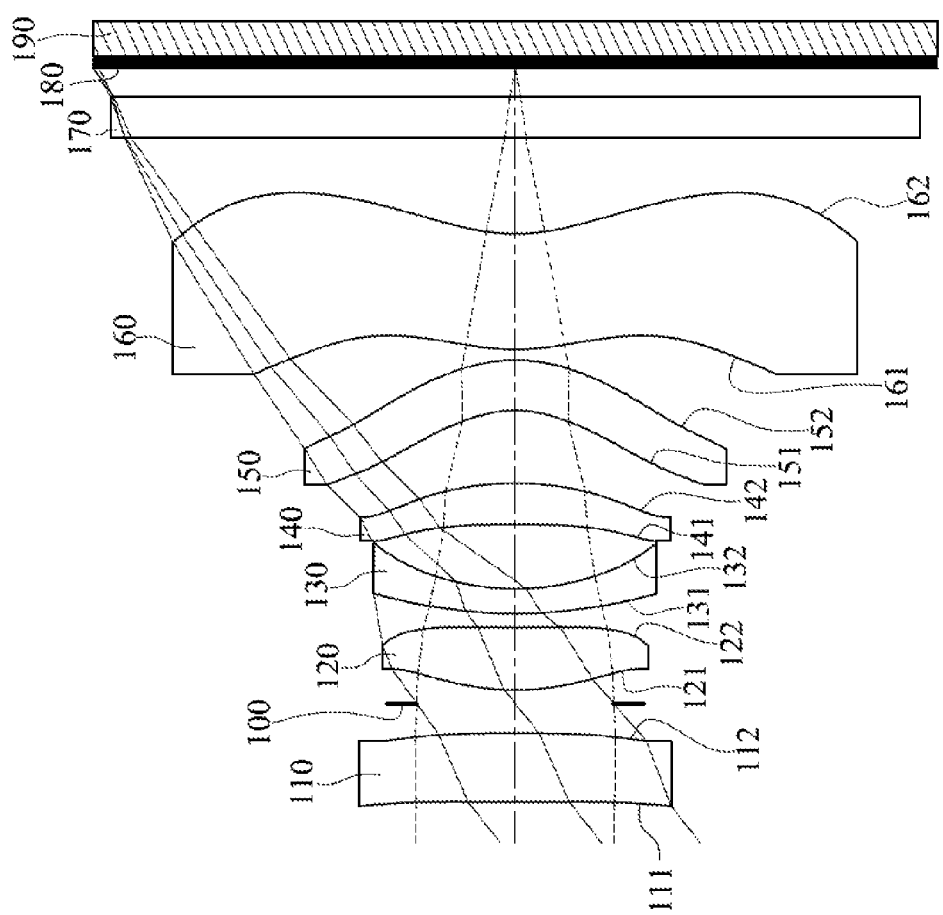
FIG. 1 is a schematic view of an image capturing unit according to the 1st embodiment of the present disclosure.

A photographing lens system includes, in order from an object side to an image side, a first lens element, a second lens element, a third lens element, a fourth lens element, a fifth lens element and a sixth lens element. The photographing lens system has a total of six lens elements.

According to the photographing lens system of the present disclosure, there can be an air gap in a paraxial region between every two lens elements of the photographing lens system that are adjacent to each other; that is, each lens element of the photographing lens system can be a single and non-cemented lens element. Moreover, the manufacturing process of the cemented lenses is more complex than the non-cemented lenses. In particular, an image-side surface of one lens element and an object-side surface of the following lens element need to have accurate curvature to ensure these two lens elements will be highly cemented. However, during the cementing process, those two lens elements might not be highly cemented due to displacement and it is thereby not favorable for the image quality. Therefore, there can be an air gap in a paraxial region between every two lens elements of the photographing lens system that are adjacent to each other in the present disclosure for avoiding problems with cemented lens elements.

The first lens element has an object-side surface and an image-side surface, and at least one of the object-side surface and the image-side surface can have at least one inflection point. Therefore, it is favorable for correcting aberrations of the off-axial field.

The second lens element with positive refractive power can have an object-side surface being convex. Therefore, it is favorable for the second lens element having sufficient focusing capability to capture the incident light at the off-axial region, and thereby enlarging the field of view.

The third lens element can have negative refractive power. The third lens element can have an image-side surface being concave. Therefore, it is favorable for correcting aberrations of the first lens element and the second lens element so as to improve the image quality.

The fourth lens element can have positive refractive power. The fourth lens element can have an object-side surface being concave and an image-side surface being convex. Therefore, it is favorable for reducing the sensitivity of the photographing lens system and correcting astigmatism so as to improve the image quality.

The fifth lens element with negative refractive power can have an object-side surface being concave and an image-side surface being convex. Therefore, it is favorable for correcting the distortion of the off-axial field and the Petzval sum of the photographing lens system so as to improve the flatness of the image surface, and thereby improving the image quality at the off-axial region.

The sixth lens element can have an object-side surface being convex and an image-side surface being concave. At least one of the object-side surface and the image-side surface of the sixth lens element can have at least one inflection point. Therefore, it is favorable for correcting aberrations of the off-axial field so as to further improve the image quality.

When a focal length of the photographing lens system is f, a curvature radius of the object-side surface of the first lens element is R1, the following condition is satisfied: $-0.60 < f/R1 < 0.80$. Therefore, the curvature of the object-side surface of the first lens element is favorable for reducing a change in direction of the incident light due to refraction so as to prevent severe aberration. Preferably, the following condition can also be satisfied: $-0.50 < f/R1 < 0.50$.

When a focal length of the first lens element is f1, a focal length of the second lens element is f2, the following condition is satisfied: $-0.50 < f2/f1 < 0.40$. Therefore, it is favorable for the photographing lens system having sufficient positive refractive power at the image side so as to balance the refractive power distribution between the object side and the image side, and thereby reducing a total track length in the photographing lens system while enlarging the field of view. Preferably, the following condition can also be satisfied: $-0.30<f2/f1<0.25$.

When a curvature radius of an object-side surface of the third lens element is R5, a curvature radius of the image-side surface of the third lens element is R6, the following condition is satisfied: $0<(R5+R6)/(R5-R6)$. Therefore, it is favorable for arranging the incident light path and correcting astigmatism of the second lens element. Preferably, the following condition can also be satisfied: $1.0<(R5+R6)/(R5-R6)$.

The photographing lens system can further include an aperture stop. When an axial distance between the aperture stop and the image-side surface of the sixth lens element is SD, an axial distance between the object-side surface of the first lens element and the image-side surface of the sixth lens element is TD, the following condition can be satisfied: $0.70<SD/TD<1.10$. Therefore, it is favorable for reducing the total track length in the photographing lens system while maintaining sufficient relative illumination.

When the focal length of the photographing lens system is f, the curvature radius of the object-side surface of the first lens element is R1, a curvature radius of the image-side surface of the first lens element is R2, the following condition can be satisfied: $|f/R1|+|f/R2|<1.10$. Therefore, the curvatures of the two surfaces of the first lens elements are favorable for correcting aberrations so as to improve the image quality.

When an Abbe number of the second lens element is V2, an Abbe number of the third lens element is V3, an Abbe number of the fifth lens element is V5, the following condition can be satisfied: $(V3+V5)/V2<1.0$. Therefore, it is favorable for correcting chromatic aberration.

When half of a maximal field of view of the photographing lens system is HFOV, the following condition can be satisfied: $38.0$ degrees$<$HFOV$<48.0$ degrees. Therefore, it is favorable for preventing overly large field of view so as to maintain the flatness of the image.

When a central thickness of the second lens element is CT2, a central thickness of the sixth lens element is CT6, the following condition can be satisfied: $0.80<CT6/CT2$. Therefore, it is favorable for balancing the central thicknesses of the photographing lens system so as to improve the capability for correcting aberrations.

When the Abbe number of the fifth lens element is V5, the following condition can be satisfied: $V5<35.0$. Therefore, it is favorable for further correcting chromatic aberration.

When an axial distance between the object-side surface of the first lens element and an image surface is TL, a maximum image height of the photographing lens system (half of a diagonal length of an effective photosensitive area of the image sensor) is ImgH, the following condition can be satisfied: $TL/ImgH<1.80$. Therefore, it is favorable for keeping the photographing lens system compact to be equipped in an electronic device.

When a curvature radius of the object-side surface of the fifth lens element is R9, a curvature radius of the image-side surface of the fifth lens element is R10, the following condition can be satisfied: $-0.4<(R9-R10)/(R9+R10)<0$. Therefore, it is favorable for improving the capability of the fifth lens element for correcting astigmatism.

When the focal length of the photographing lens system is f, the focal length of the first lens element is f1, a focal length of the sixth lens element is f6, the following condition can be satisfied: $|f/f1|+|f/f6|<0.50$. Therefore, the curvatures of the object side surface of the first lens element and the image-side surface of the sixth lens element are favorably balanced for preventing severe aberrations. Furthermore, it is favorable for enhancing the symmetry of the photographing lens system so as to improve the image quality.

When an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, an axial distance between the fifth lens element and the sixth lens element is T56, the following conditions can be satisfied: $T23<T12<T34$; $T23<T12<T45$; $T56<T12<T34$; and $T56<T12<T45$. Therefore, it is favorable for arranging the axial distances between every two adjacent lens elements so as to maintain a compact size thereof.

When a curvature radius of the object-side surface of the second lens element is R3, a curvature radius of an image-side surface of the second lens element is R4, the following condition can be satisfied: $(R3+R4)/(R3-R4)<0$. Therefore, it is favorable for correcting spherical aberration and astigmatism.

When a maximum refractive index among the lens elements of the photographing lens system is Nmax, the following condition can be satisfied: $Nmax<1.70$. Therefore, it is favorable for arranging the refractive indices of the lens elements so as to improve the focusing capability. According to the photographing lens system, Nmax is the maximum refractive index among the refractive indices of the six lens elements.

When the axial distance between the object-side surface of the first lens element and the image surface is TL, the following condition can be satisfied: $TL<8.0$ mm. Therefore, it is favorable for reducing the total track length so as to obtain compactness.

The second lens element can have the strongest refractive power among the lens elements of the photographing lens system. That is, the refractive power of the second lens element can be greater than each refractive power of the first lens element, the third lens element, the fourth lens element, the fifth lens element and the sixth lens element. Therefore, it is favorable for providing the second lens element with proper positive refractive power so as to enlarge the field of view while reducing the total track length. The refractive power of a lens element is defined as a ratio of the focal length of the photographing lens system to the focal length of the lens element. The lens element with the strongest refractive power among all lens elements can be defined by having the largest absolute value of refractive power among all lens elements.

According to the present disclosure, an aperture stop can be configured as a front stop or a middle stop. A front stop disposed between an imaged object and the first lens element can produce a telecentric effect by providing a longer distance between an exit pupil and the image surface and thereby improving the image-sensing efficiency of an image sensor (for example, CCD or CMOS). A middle stop disposed between the first lens element and the image surface is favorable for enlarging the view angle and thereby provides a wider field of view.

According to the present disclosure, the lens elements of the photographing lens system can be made of glass or plastic material. When the lens elements are made of glass material, the refractive power distribution of the photographing lens system may be more flexible to design. When the lens elements are made of plastic material, manufacturing costs can be effectively reduced. Furthermore, surfaces of each lens element can be arranged to be aspheric, since the aspheric surface of the lens element is easy to form a shape other than spherical surface so as to have more controllable variables for eliminating aberrations thereof, and to further decrease the required number of the lens elements. Therefore, the total track length of the photographing lens system can also be reduced.

According to the present disclosure, each of an object-side surface and an image-side surface has a paraxial region and an off-axial region. The paraxial region refers to the region of the surface where light rays travel close to the optical axis, and the off-axial region refers to the region of the surface away from the paraxial region. Particularly unless otherwise stated, when the lens element has a convex surface, it indicates that the surface can be convex in the paraxial region thereof; when the lens element has a concave surface, it indicates that the surface can be concave in the paraxial region thereof. Moreover, when a region of refractive power or focus of a lens element is not defined, it indicates that the region of refractive power or focus of the lens element can be in the paraxial region thereof.

According to the present disclosure, an image surface of the photographing lens system, based on the corresponding image sensor, can be flat or curved, particularly a curved surface being concave facing towards the object side of the photographing lens system.

According to the present disclosure, the photographing lens system can include at least one stop, such as an aperture stop, a glare stop or a field stop. Said glare stop or said field stop is allocated for eliminating the stray light and thereby improving the image quality thereof.

According to the present disclosure, an image capturing unit is provided. The image capturing unit includes the photographing lens system according to the aforementioned photographing lens system of the present disclosure, and an image sensor, wherein the image sensor is disposed on the image side of the aforementioned photographing lens system, that is, the image sensor can be disposed on or near an image surface of the aforementioned photographing lens system. In some embodiments, the image capturing unit can further include a barrel member, a holding member or a combination thereof.

Figure 17:
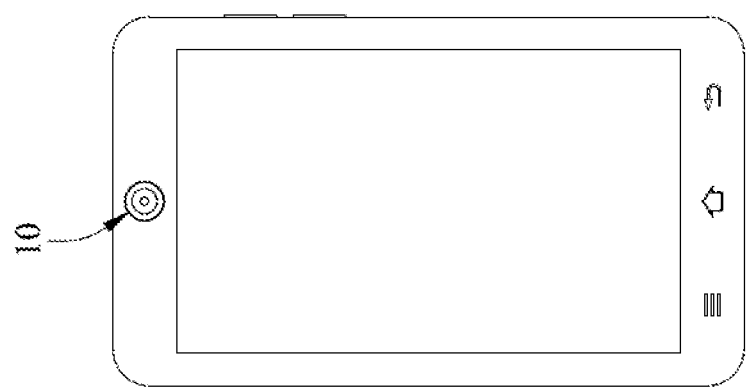
FIG. 17 shows an electronic device according to one embodiment.
Figure 18:
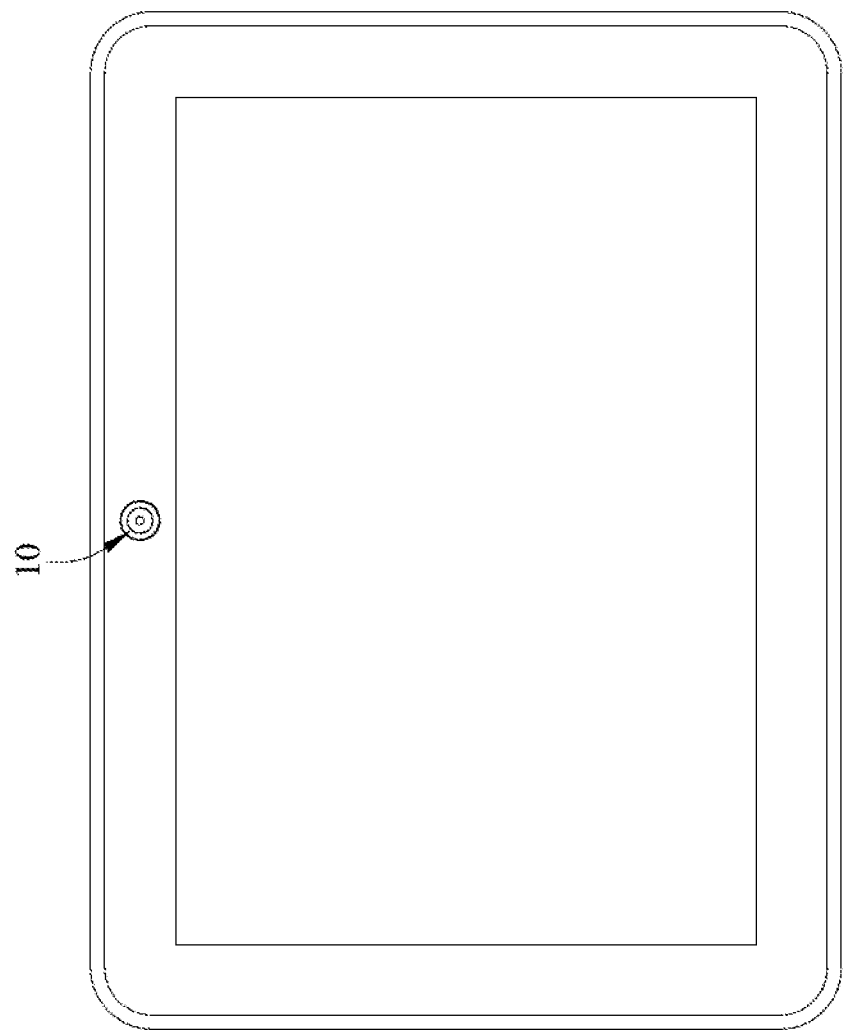
FIG. 18 shows an electronic device according to another embodiment.

In FIG. 17, FIG. 18, and FIG. 19, an image capturing unit 10 may be installed in, but not limited to, an electronic device, including a smart phone (FIG. 17), a tablet personal computer (FIG. 18) or a wearable device (FIG. 19). The electronic devices shown in the figures are only exemplary for showing the image capturing unit of the present disclosure installed in an electronic device and are not limited thereto. In some embodiments, the electronic device can further include, but not limited to, a display unit, a control unit, a storage unit, a random access memory unit (RAM), a read only memory unit (ROM) or a combination thereof.

According to the present disclosure, the photographing lens system can be optionally applied to optical systems with a movable focus. Furthermore, the photographing lens system is featured with good capability in aberration corrections and high image quality, and can be applied to 3D (three-dimensional) image capturing applications, in products such as digital cameras, mobile devices, digital tablets, wearable devices, smart televisions, network surveillance devices, motion sensing input devices, dashboard cameras, vehicle backup cameras and other electronic imaging devices. According to the above description of the present disclosure, the following specific embodiments are provided for further explanation.

1st Embodiment

Figure 2:
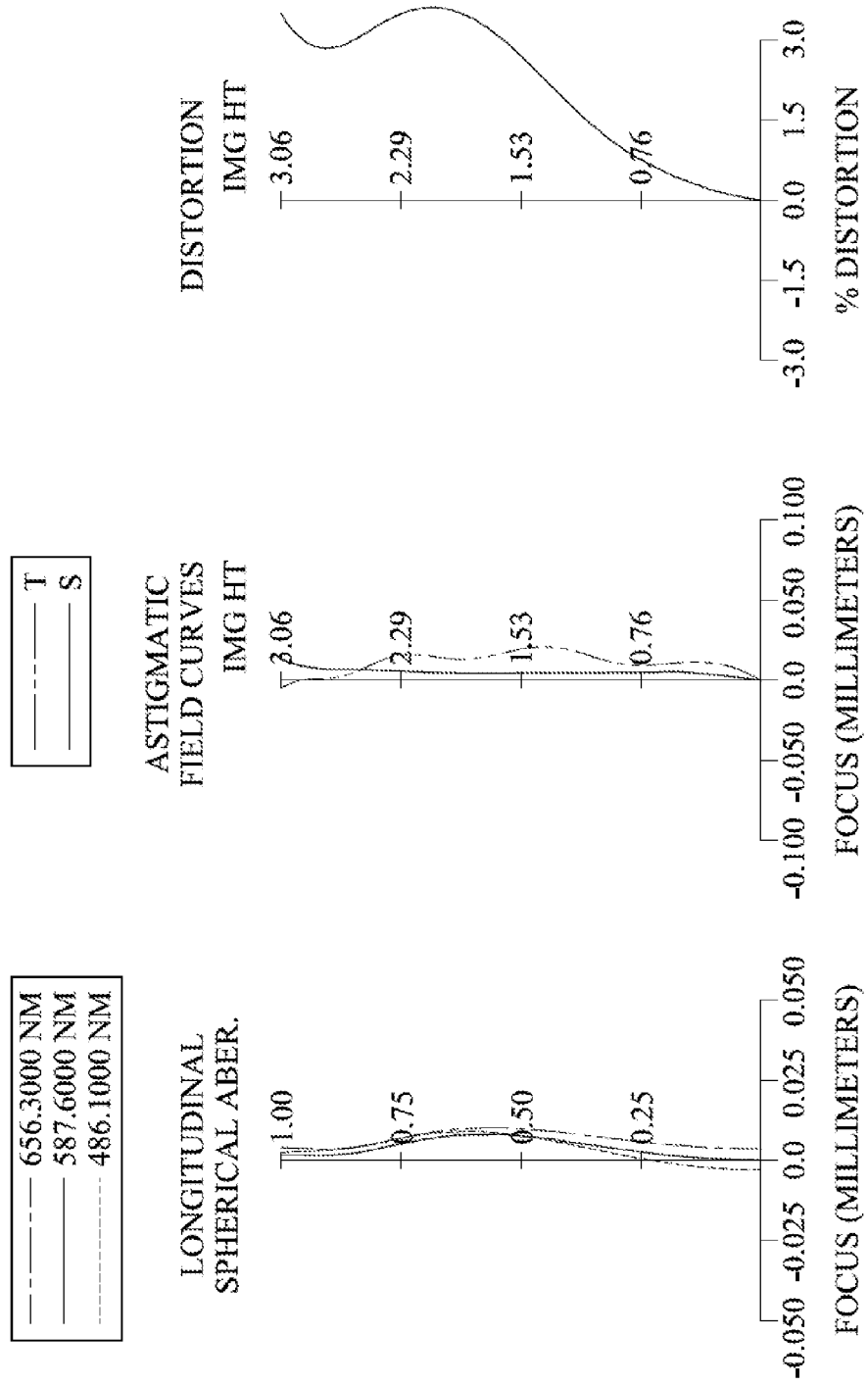
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the photographing lens system (its reference numeral is omitted) of the present disclosure and an image sensor 190. The photographing lens system includes, in order from an object side to an image side, a first lens element 110, an aperture stop 100, a second lens element 120, a third lens element 130, a fourth lens element 140, a fifth lens element 150, a sixth lens element 160, an IR-cut filter 170 and an image surface 180, wherein the photographing lens system has a total of six lens elements (110-160). There is an air gap in the paraxial region between every two of the first lens element 110, the second lens element 120, the third lens element 130, the fourth lens element 140, the fifth lens element 150 and the sixth lens element 160 that are adjacent to each other.

The first lens element 110 with positive refractive power has an object-side surface 111 being convex and an image-side surface 112 being convex. The first lens element 110 is made of plastic material and has the object-side surface 111 and the image-side surface 112 being both aspheric. The object-side surface 111 of the first lens element 110 has at least one inflection point.

The second lens element 120 with positive refractive power has an object-side surface 121 being convex and an image-side surface 122 being concave. The second lens element 120 is made of plastic material and has the object-side surface 121 and the image-side surface 122 being both aspheric.

The third lens element 130 with negative refractive power has an object-side surface 131 being convex and an image-side surface 132 being concave. The third lens element 130 is made of plastic material and has the object-side surface 131 and the image-side surface 132 being both aspheric.

The fourth lens element 140 with positive refractive power has an object-side surface 141 being concave and an image-side surface 142 being convex. The fourth lens element 140 is made of plastic material and has the object-side surface 141 and the image-side surface 142 being both aspheric.

The fifth lens element 150 with negative refractive power has an object-side surface 151 being concave and an image-side surface 152 being convex. The fifth lens element 150 is made of plastic material and has the object-side surface 151 and the image-side surface 152 being both aspheric.

The sixth lens element 160 with positive refractive power has an object-side surface 161 being convex and an image-side surface 162 being concave. The sixth lens element 160 is made of plastic material and has the object-side surface 161 and the image-side surface 162 being both aspheric. Both the object-side surface 161 and the image-side surface 162 of the sixth lens element 160 have at least one inflection point.

The IR-cut filter 170 is made of glass and located between the sixth lens element 160 and the image surface 180, and will not affect the focal length of the photographing lens system. The image sensor 190 is disposed on or near the image surface 180 of the photographing lens system.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14 and 16.

In the photographing lens system of the image capturing unit according to the 1st embodiment, when a focal length of the photographing lens system is f, an f-number of the photographing lens system is Fno, and half of a maximal field of view of the photographing lens system is HFOV, these parameters have the following values: f=3.74 millimeters (mm); Fno=2.60; and HFOV=38.3 degrees (deg.).

When a maximum refractive index among the lens elements (the first lens element 110, the second lens element 120, the third lens element 130, the fourth lens element 140, the fifth lens element 150 and the sixth lens element 160) of the photographing lens system is Nmax, the following condition is satisfied: Nmax=1.661.

When an Abbe number of the fifth lens element 150 is V5, the following condition is satisfied: V5=20.4.

When an Abbe number of the second lens element 120 is V2, an Abbe number of the third lens element 130 is V3, the Abbe number of the fifth lens element 150 is V5, the following condition is satisfied: (V3+V5)/V2=0.73.

When a central thickness of the second lens element 120 is CT2, a central thickness of the sixth lens element 160 is CT6, the following condition is satisfied: CT6/CT2=1.850.

When the focal length of the photographing lens system is f, a curvature radius of the object-side surface 111 of the first lens element 110 is R1, the following condition is satisfied: f/R1=0.13.

When the focal length of the photographing lens system is f, the curvature radius of the object-side surface 111 of the first lens element 110 is R1, a curvature radius of the image-side surface 112 of the first lens element 110 is R2, the following condition is satisfied: |f/R1|+|f/R2|=0.27.

When a curvature radius of the object-side surface 121 of the second lens element 120 is R3, a curvature radius of the image-side surface 122 of the second lens element 120 is R4, the following condition is satisfied: (R3+R4)/(R3−R4)=−1.26.

When a curvature radius of the object-side surface 131 of the third lens element 130 is R5, a curvature radius of the image-side surface 132 of the third lens element 130 is R6, the following condition is satisfied: (R5+R6)/(R5−R6)=4.32.

When a curvature radius of the object-side surface 151 of the fifth lens element 150 is R9, a curvature radius of the image-side surface 152 of the fifth lens element 150 is R10, the following condition is satisfied: (R9−R10)/(R9+R10)=−0.17.

When a focal length of the first lens element 110 is f1, a focal length of the second lens element 120 is f2, the following condition is satisfied: f2/f1=0.14.

When the focal length of the photographing lens system is f, the focal length of the first lens element 110 is f1, a focal length of the sixth lens element 160 is f6, the following condition is satisfied: |f/f1|+|f/f6|=0.20.

When an axial distance between the aperture stop 100 and the image-side surface 162 of the sixth lens element 160 is SD, an axial distance between the object-side surface 111 of the first lens element 110 and the image-side surface 162 of the sixth lens element 160 is TD, the following condition is satisfied: SD/TD=0.83. When an axial distance between the object-side surface 111 of the first lens element 110 and the image surface 180 is TL, a maximum image height of the photographing lens system is ImgH, the following condition is satisfied: TL/ImgH=1.74.

When the axial distance between the object-side surface 111 of the first lens element 110 and the image surface 180 is TL, the following condition is satisfied: TL=5.33 mm.

In this embodiment, the second lens element 120 has the strongest refractive power among all lens elements of the photographing lens system. That is, the refractive power of the second lens element 120 has the largest absolute value among all lens elements (110-160) of the photographing lens system. Since the refractive power of a lens element is inversely related to its focal length, the second lens element 120 has the largest absolute value of refractive power as shown in the TABLE 1 below by having the smallest focal length value (|f2|=3.71).

The detailed optical data of the 1st embodiment are shown in Table 1 and the aspheric surface data are shown in Table 2 below.

TABLE 1

1st Embodiment
f = 3.74 mm, Fno = 2.60, HFOV = 38.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 27.894 | (ASP) | 0.500 | Plastic | 1.544 | 55.9 | 25.81 |
| 2 | | −28.102 | (ASP) | 0.215 | | | | |
| 3 | Ape.Stop | Plano | | 0.100 | | | | |
| 4 | Lens 2 | 1.810 | (ASP) | 0.454 | Plastic | 1.544 | 55.9 | 3.71 |
| 5 | | 15.834 | (ASP) | 0.100 | | | | |
| 6 | Lens 3 | 2.710 | (ASP) | 0.180 | Plastic | 1.661 | 20.4 | −7.33 |
| 7 | | 1.692 | (ASP) | 0.469 | | | | |
| 8 | Lens 4 | −10.025 | (ASP) | 0.299 | Plastic | 1.544 | 55.9 | 5.34 |
| 9 | | −2.276 | (ASP) | 0.530 | | | | |

TABLE 1-continued

1st Embodiment
f = 3.74 mm, Fno = 2.60, HFOV = 38.3 deg.

| Surface # | | Curvature Radius | | Thickness | Material | Index | Abbe # | Focal Length |
|---|---|---|---|---|---|---|---|---|
| 10 | Lens 5 | −0.818 | (ASP) | 0.365 | Plastic | 1.661 | 20.4 | −7.20 |
| 11 | | −1.164 | (ASP) | 0.077 | | | | |
| 12 | Lens 6 | 1.573 | (ASP) | 0.840 | Plastic | 1.544 | 55.9 | 70.38 |
| 13 | | 1.332 | (ASP) | 0.700 | | | | |
| 14 | IR-cut filter | Plano | | 0.300 | Glass | 1.517 | 64.2 | — |
| 15 | | Plano | | 0.206 | | | | |
| 16 | Image | Plano | | — | | | | |

Note:
Reference wavelength is 587.6 nm (d-line).

TABLE 2

Aspheric Coefficients

| Surface # | 1 | 2 | 4 | 5 | 6 | 7 |
|---|---|---|---|---|---|---|
| k = | −2.6089E+01 | 2.0000E+01 | −2.2719E+00 | −9.0000E+01 | −1.8248E+01 | −7.4714E+00 |
| A4 = | −4.7564E−02 | −8.8760E−02 | −2.5441E−02 | −1.3138E−01 | −8.0694E−02 | 4.9091E−02 |
| A6 = | 1.6282E−02 | 5.9244E−02 | −3.6007E−02 | 5.0092E−02 | 1.6444E−01 | 3.8043E−02 |
| A8 = | −1.3479E−02 | −1.5852E−02 | 5.5618E−02 | −5.8401E−02 | −8.4675E−03 | 1.3262E−01 |
| A10 = | 1.8845E−02 | −1.4595E−03 | −1.2810E−01 | −8.1382E−02 | −1.2712E−01 | −1.9692E−01 |
| A12 = | −1.1845E−02 | — | — | 5.7740E−02 | 5.2761E−02 | 1.0232E−01 |
| A14 = | 2.5814E−03 | — | — | −3.6405E−02 | 7.8168E−03 | −2.2683E−02 |

| Surface # | 8 | 9 | 10 | 11 | 12 | 13 |
|---|---|---|---|---|---|---|
| k = | −1.3881E+01 | 2.4031E+00 | −3.8686E+00 | −7.0553E−01 | −1.0820E+01 | −5.5683E+00 |
| A4 = | −9.4579E−02 | 7.7355E−04 | −6.0686E−02 | 1.1870E−01 | −1.4046E−01 | −5.9708E−02 |
| A6 = | −2.7460E−02 | −1.7016E−02 | −2.6676E−02 | −5.4613E−02 | 7.0224E−02 | 2.3245E−02 |
| A8 = | 1.1715E−02 | 3.1364E−02 | 1.1676E−01 | 2.1434E−02 | −4.4092E−02 | −8.7783E−03 |
| A10 = | 1.6826E−03 | 3.5511E−02 | −4.6540E−02 | 1.0691E−02 | 2.1161E−02 | 2.2755E−03 |
| A12 = | 1.2973E−02 | −3.7530E−03 | −6.6649E−03 | −2.8427E−03 | −5.7903E−03 | −3.8192E−04 |
| A14 = | 6.4660E−02 | 5.9030E−05 | 3.2906E−03 | −2.6029E−03 | 8.4021E−04 | 3.6230E−05 |
| A16 = | −3.8785E−02 | — | 5.3306E−04 | 7.3541E−04 | −5.2173E−05 | −1.4472E−06 |

In Table 1, the curvature radius, the thickness and the focal length are shown in millimeters (mm). Surface numbers 0-16 represent the surfaces sequentially arranged from the object side to the image side along the optical axis. In Table 2, k represents the conic coefficient of the equation of the aspheric surface profiles. A4-A16 represent the aspheric coefficients ranging from the 4th order to the 14th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
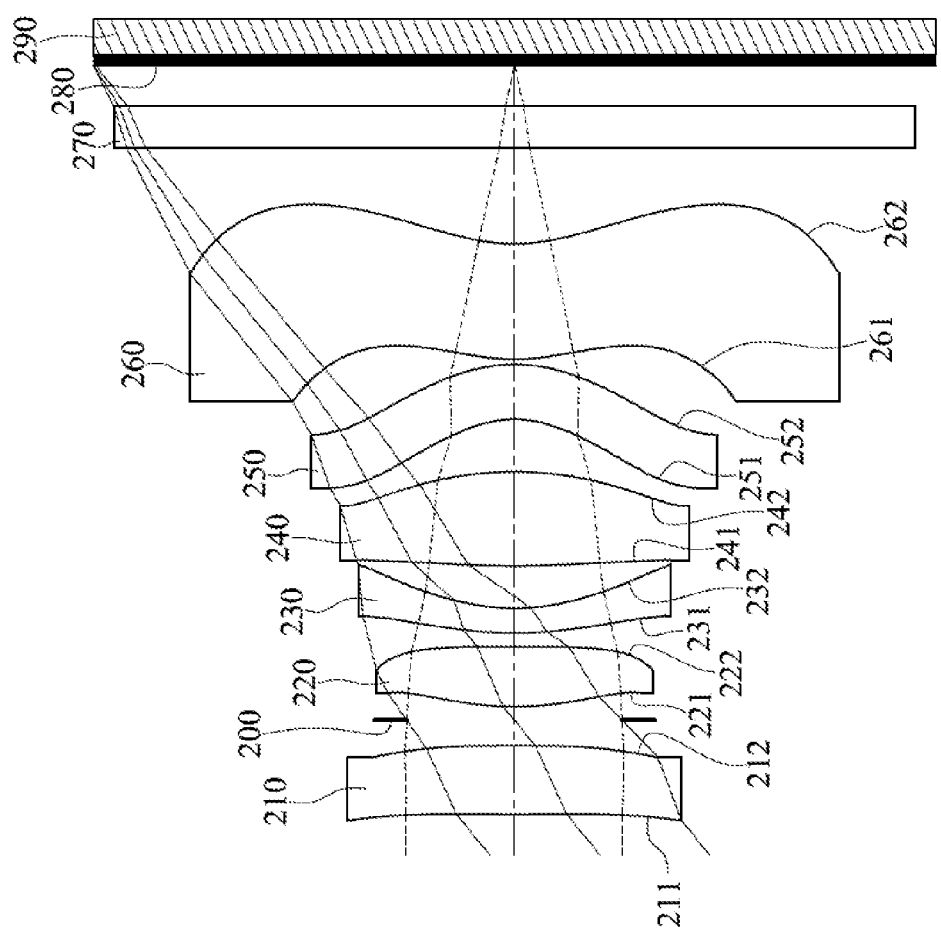
FIG. 3 is a schematic view of an image capturing unit according to the 2nd embodiment of the present disclosure.
Figure 4:
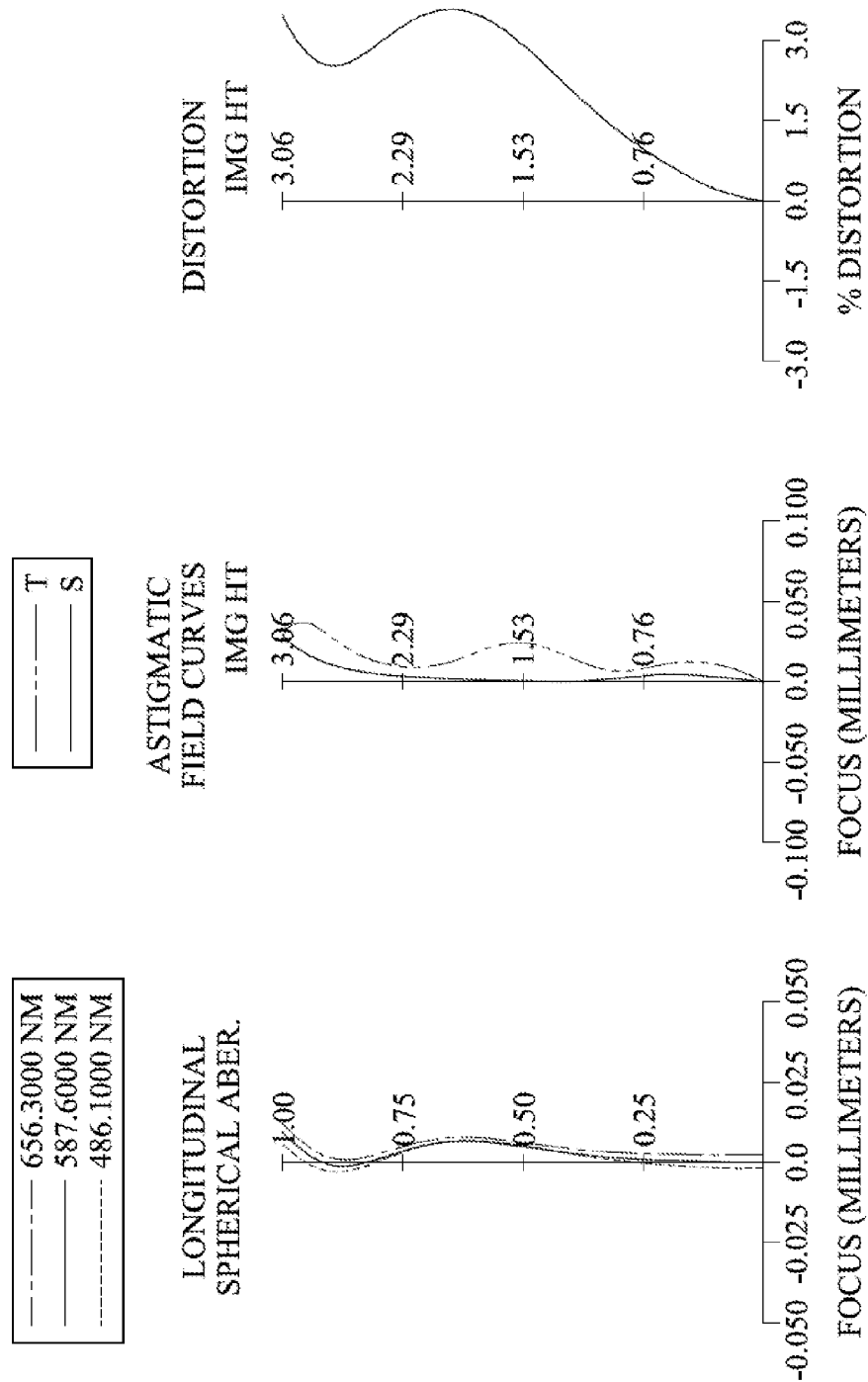
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the photographing lens system (its reference numeral is omitted) of the present disclosure and an image sensor 290. The photographing lens system includes, in order from an object side to an image side, a first lens element 210, an aperture stop 200, a second lens element 220, a third lens element 230, a fourth lens element 240, a fifth lens element 250, a sixth lens element 260, an IR-cut filter 270 and an image surface 280, wherein the photographing lens system has a total of six lens elements (210-260). There is an air gap in the paraxial region between every two of the first lens element 210, the second lens element 220, the third lens element 230, the fourth lens element 240, the fifth lens element 250 and the sixth lens element 260 that are adjacent to each other.

The first lens element 210 with positive refractive power has an object-side surface 211 being convex and an image-side surface 212 being convex. The first lens element 210 is made of plastic material and has the object-side surface 211 and the image-side surface 212 being both aspheric. The object-side surface 211 of the first lens element 210 has at least one inflection point.

The second lens element 220 with positive refractive power has an object-side surface 221 being convex and an image-side surface 222 being concave. The second lens element 220 is made of plastic material and has the object-side surface 221 and the image-side surface 222 being both aspheric.

The third lens element 230 with negative refractive power has an object-side surface 231 being convex and an image-side surface 232 being concave. The third lens element 230 is made of plastic material and has the object-side surface 231 and the image-side surface 232 being both aspheric.

The fourth lens element 240 with positive refractive power has an object-side surface 241 being convex and an image-side surface 242 being convex. The fourth lens element 240 is made of plastic material and has the object-side surface 241 and the image-side surface 242 being both aspheric.

The fifth lens element 250 with negative refractive power has an object-side surface 251 being concave and an image-side surface 252 being convex. The fifth lens element 250 is made of plastic material and has the object-side surface 251 and the image-side surface 252 being both aspheric.

The sixth lens element 260 with positive refractive power has an object-side surface 261 being convex and an image-side surface 262 being concave. The sixth lens element 260 is made of plastic material and has the object-side surface 261 and the image-side surface 262 being both aspheric.

Both the object-side surface 261 and the image-side surface 262 of the sixth lens element 260 have at least one inflection point.

The IR-cut filter 270 is made of glass and located between the sixth lens element 260 and the image surface 280, and will not affect the focal length of the photographing lens system. The image sensor 290 is disposed on or near the image surface 280 of the photographing lens system.

The detailed optical data of the 2nd embodiment are shown in Table 3 and the aspheric surface data are shown in Table 4 below.

TABLE 3

2nd Embodiment
f = 3.62 mm, Fno = 2.30, HFOV = 39.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 27.894 | (ASP) | 0.500 | Plastic | 1.535 | 55.7 | 26.23 |
| 2 | | −28.073 | (ASP) | 0.184 | | | | |
| 3 | Ape. Stop | Plano | | 0.100 | | | | |
| 4 | Lens 2 | 2.148 | (ASP) | 0.435 | Plastic | 1.544 | 55.9 | 4.02 |
| 5 | | 107.532 | (ASP) | 0.100 | | | | |
| 6 | Lens 3 | 2.339 | (ASP) | 0.180 | Plastic | 1.640 | 23.3 | −6.23 |
| 7 | | 1.430 | (ASP) | 0.310 | | | | |
| 8 | Lens 4 | 6.994 | (ASP) | 0.685 | Plastic | 1.535 | 55.7 | 3.56 |
| 9 | | −2.533 | (ASP) | 0.383 | | | | |
| 10 | Lens 5 | −0.742 | (ASP) | 0.398 | Plastic | 1.640 | 23.3 | −5.25 |
| 11 | | −1.152 | (ASP) | 0.039 | | | | |
| 12 | Lens 6 | 1.457 | (ASP) | 0.840 | Plastic | 1.535 | 55.7 | 23.44 |
| 13 | | 1.318 | (ASP) | 0.700 | | | | |
| 14 | IR-cut filter | Plano | | 0.300 | Glass | 1.517 | 64.2 | — |
| 15 | | Plano | | 0.296 | | | | |
| 16 | Image | Plano | | — | | | | |

Note:
Reference wavelength is 587.6 nm (d-line).

TABLE 4

Aspheric Coefficients

| Surface # | 1 | 2 | 4 | 5 | 6 | 7 |
|---|---|---|---|---|---|---|
| k = | −8.5752E+01 | 2.0000E+01 | −4.9562E+00 | 2.0000E+01 | −2.2411E+01 | −8.0516E+00 |
| A4 = | −5.1192E−02 | −1.1959E−01 | −4.9836E−02 | −1.3239E−01 | −7.7837E−02 | 3.7444E−02 |
| A6 = | 1.6728E−02 | 9.0932E−02 | −6.3724E−02 | 7.0446E−02 | 1.4401E−01 | −1.2653E−03 |
| A8 = | −9.8534E−03 | −3.8656E−02 | 1.2643E−01 | −6.3512E−02 | −2.4090E−02 | 1.0769E−01 |
| A10 = | 1.0658E−02 | 7.4377E−03 | −1.4463E−01 | −6.2667E−02 | −1.1692E−01 | −1.8716E−01 |
| A12 = | −5.4528E−03 | — | — | 5.7740E−02 | 4.9957E−02 | 1.0720E−01 |
| A14 = | 9.7489E−04 | — | — | −3.6405E−02 | 7.8168E−03 | −2.2683E−02 |

| Surface # | 8 | 9 | 10 | 11 | 12 | 13 |
|---|---|---|---|---|---|---|
| k = | 1.7849E+01 | 2.2441E+00 | −3.5095E+00 | −7.5475E−01 | −9.2681E+00 | −4.5579E+00 |
| A4 = | −4.5183E−02 | 2.6456E−02 | −6.2446E−02 | 1.1390E−01 | −1.6262E−01 | −7.6758E−02 |
| A6 = | 4.7386E−03 | −5.6120E−03 | −2.3088E−02 | −4.3838E−02 | 6.5272E−02 | 2.8945E−02 |
| A8 = | 6.2682E−03 | 1.3092E−02 | 1.2152E−01 | 2.2547E−02 | −4.2753E−02 | −1.0156E−02 |
| A10 = | −2.6738E−02 | 1.2086E−02 | −4.4737E−02 | 1.0067E−02 | 2.0539E−02 | 2.4107E−03 |
| A12 = | −1.4501E−02 | −1.1219E−02 | −6.5158E−03 | −2.9861E−03 | −5.9317E−03 | −3.8175E−04 |
| A14 = | 6.4190E−02 | 4.6114E−03 | 3.1235E−03 | −2.5929E−03 | 8.6375E−04 | 3.4666E−05 |
| A16 = | −3.1162E−02 | — | 3.1958E−04 | 7.5978E−04 | −5.3654E−05 | −1.3886E−06 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 3.62 | (R3 + R4)/(R3 − R4) | −1.04 |
| Fno | 2.30 | (R5 + R6)/(R5 − R6) | 4.14 |
| HFOV [deg.] | 39.2 | (R9 − R10)/(R9 + R10) | −0.22 |
| Nmax | 1.640 | f2/f1 | 0.15 |
| V5 | 23.3 | \|f/f1\| + \|f/f6\| | 0.29 |
| (V3 + V5)/V2 | 0.83 | SD/TD | 0.84 |
| CT6/CT2 | 1.931 | TL/ImgH | 1.78 |
| f/R1 | 0.13 | TL [mm] | 5.45 |
| \|f/R1\| + \|f/R2\| | 0.26 | | |

3rd Embodiment

Figure 5:
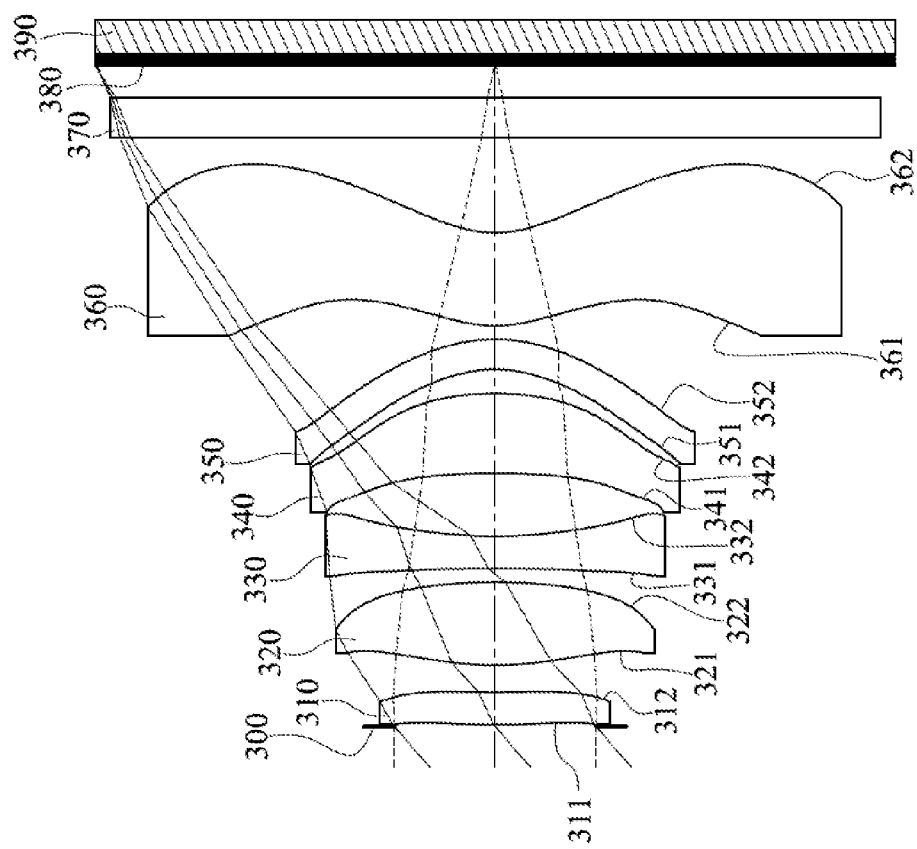
FIG. 5 is a schematic view of an image capturing unit according to the 3rd embodiment of the present disclosure.
Figure 6:
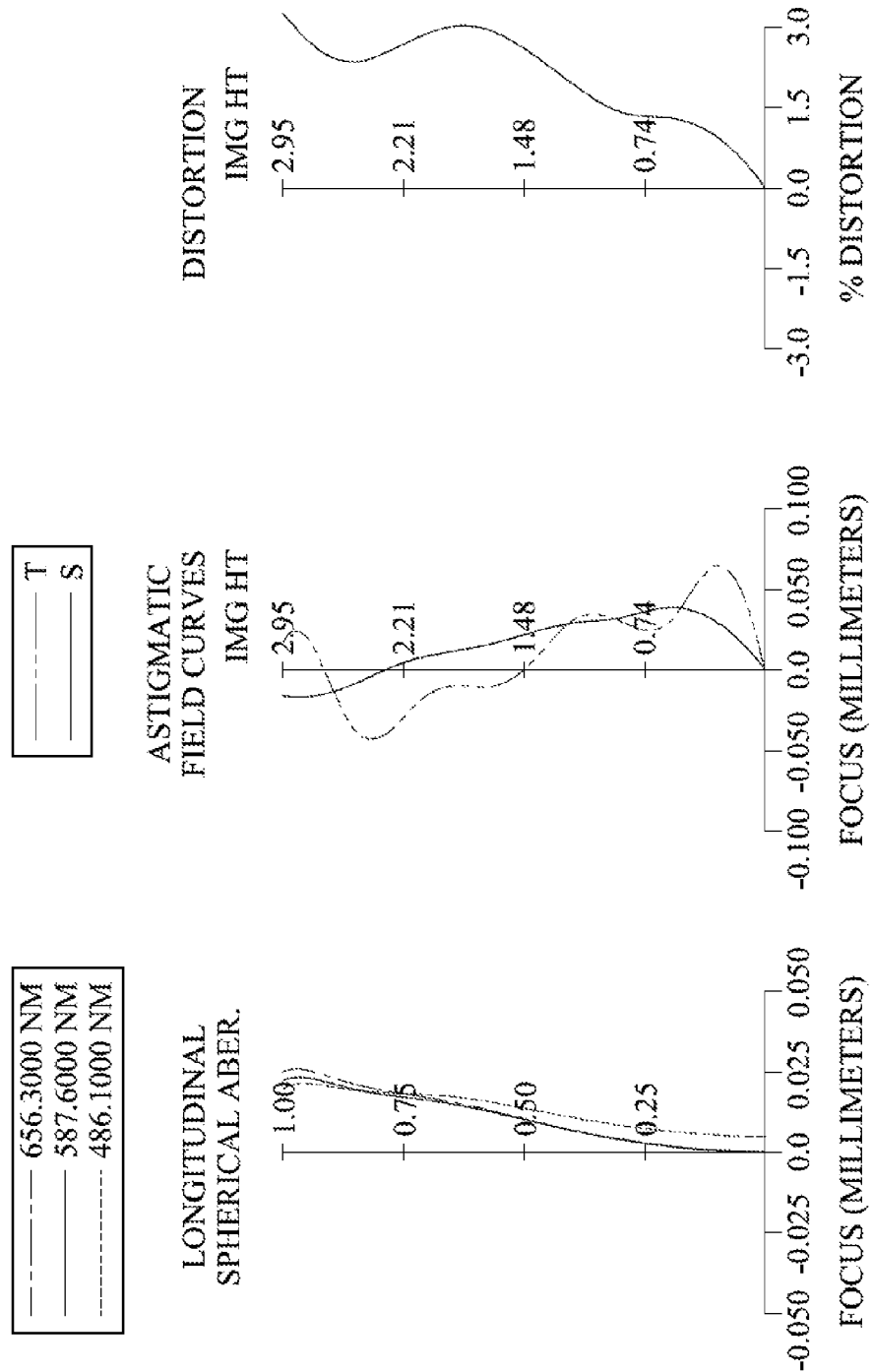
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the photographing lens system (its reference numeral is omitted) of the present disclosure and an image sensor 390. The photographing lens system includes, in order from an object side to an image side, an aperture stop 300, a first lens element 310, a second lens element 320, a third lens element 330, a fourth lens element 340, a fifth lens element 350, a sixth lens element 360, an IR-cut filter 370 and an image surface 380, wherein the photographing lens system has a total of six lens elements (310-360). There is an air gap in the paraxial region between every two of the first lens element 310, the second lens element 320, the third lens element 330, the fourth lens element 340, the fifth lens element 350 and the sixth lens element 360 that are adjacent to each other.

The first lens element 310 with positive refractive power has an object-side surface 311 being convex and an image-side surface 312 being concave. The first lens element 310 is made of plastic material and has the object-side surface 311 and the image-side surface 312 being both aspheric. Both the object-side surface 311 and the image-side surface 312 of the first lens element 310 have at least one inflection point.

The second lens element 320 with positive refractive power has an object-side surface 321 being convex and an image-side surface 322 being convex. The second lens element 320 is made of plastic material and has the object-side surface 321 and the image-side surface 322 being both aspheric.

The third lens element 330 with negative refractive power has an object-side surface 331 being concave and an image-side surface 332 being concave. The third lens element 330 is made of plastic material and has the object-side surface 331 and the image-side surface 332 being both aspheric.

The fourth lens element 340 with positive refractive power has an object-side surface 341 being concave and an image-side surface 342 being convex. The fourth lens element 340 is made of plastic material and has the object-side surface 341 and the image-side surface 342 being both aspheric.

The fifth lens element 350 with negative refractive power has an object-side surface 351 being concave and an image-side surface 352 being convex. The fifth lens element 350 is made of plastic material and has the object-side surface 351 and the image-side surface 352 being both aspheric.

The sixth lens element 360 with positive refractive power has an object-side surface 361 being convex and an image-side surface 362 being concave. The sixth lens element 360 is made of plastic material and has the object-side surface 361 and the image-side surface 362 being both aspheric. Both the object-side surface 361 and the image-side surface 362 of the sixth lens element 360 have at least one inflection point.

The IR-cut filter 370 is made of glass and located between the sixth lens element 360 and the image surface 380, and will not affect the focal length of the photographing lens system. The image sensor 390 is disposed on or near the image surface 380 of the photographing lens system.

In this embodiment, the second lens element 320 has the strongest refractive power among all lens elements of the photographing lens system. That is, the refractive power of the second lens element 320 has the largest absolute value among all lens elements (310-360) of the photographing lens system. Since the refractive power of a lens element is inversely related to its focal length, the second lens element 320 has the largest absolute value of refractive power as shown in the TABLE 5 below by having the smallest focal length value (|f2|=2.99).

The detailed optical data of the 3rd embodiment are shown in Table 5 and the aspheric surface data are shown in Table 6 below.

TABLE 5

3rd Embodiment
f = 3.27 mm, Fno = 2.20, HFOV = 41.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | 0.013 | | | | |
| 2 | Lens 1 | 5.367 | (ASP) | 0.241 | Plastic | 1.535 | 55.7 | 23.26 |
| 3 | | 9.289 | (ASP) | 0.200 | | | | |
| 4 | Lens 2 | 2.487 | (ASP) | 0.613 | Plastic | 1.544 | 55.9 | 2.99 |
| 5 | | −4.305 | (ASP) | 0.100 | | | | |
| 6 | Lens 3 | −65.974 | (ASP) | 0.238 | Plastic | 1.640 | 23.3 | −4.78 |
| 7 | | 3.208 | (ASP) | 0.466 | | | | |

TABLE 5-continued

3rd Embodiment
f = 3.27 mm, Fno = 2.20, HFOV = 41.0 deg.

| Surface # | | Curvature Radius | | Thickness | Material | Index | Abbe # | Focal Length |
|---|---|---|---|---|---|---|---|---|
| 8 | Lens 4 | −6.246 | (ASP) | 0.591 | Plastic | 1.544 | 55.9 | 5.68 |
| 9 | | −2.138 | (ASP) | 0.178 | | | | |
| 10 | Lens 5 | −0.886 | (ASP) | 0.221 | Plastic | 1.661 | 20.4 | −6.52 |
| 11 | | −1.226 | (ASP) | 0.100 | | | | |
| 12 | Lens 6 | 0.929 | (ASP) | 0.688 | Plastic | 1.544 | 55.9 | 10.47 |
| 13 | | 0.820 | (ASP) | 0.700 | | | | |
| 14 | IR-cut filter | Plano | | 0.300 | Glass | 1.517 | 64.2 | — |
| 15 | | Plano | | 0.238 | | | | |
| 16 | Image | Plano | | — | | | | |

Note:
Reference wavelength is 587.6 nm (d-line).

TABLE 6

Aspheric Coefficients

| Surface # | 2 | 3 | 4 | 5 | 6 | 7 |
|---|---|---|---|---|---|---|
| k = | −3.9156E+01 | −4.4004E+01 | −2.8493E+00 | −1.7073E+01 | −9.0000E+01 | −2.0944E+01 |
| A4 = | −1.0152E−01 | −2.0754E−01 | −5.0942E−02 | −9.2947E−02 | −1.3536E−01 | −8.7279E−03 |
| A6 = | −6.9371E−02 | −2.6092E−02 | −9.1988E−02 | 1.0299E−01 | 1.8860E−01 | −1.3804E−02 |
| A8 = | 3.5870E−02 | 2.8442E−02 | 1.1542E−01 | −1.0503E−01 | 2.3396E−03 | 1.5192E−01 |
| A10 = | −5.7160E−02 | 1.8083E−02 | −5.6307E−02 | −2.7587E−02 | −1.3493E−01 | −1.8854E−01 |
| A12 = | −1.1958E−02 | — | — | 6.5846E−02 | 5.7198E−02 | 1.0376E−01 |
| A14 = | 8.0427E−02 | — | — | −2.6338E−02 | −9.6490E−04 | −2.6212E−02 |

| Surface # | 8 | 9 | 10 | 11 | 12 | 13 |
|---|---|---|---|---|---|---|
| k = | −5.5426E+01 | 1.2271E+00 | −6.6406E+00 | −5.4174E−01 | −7.0183E+00 | −3.5762E+00 |
| A4 = | −8.0353E−02 | −9.6037E−02 | −1.8626E−01 | 9.7935E−02 | −1.1594E−01 | −6.7942E−02 |
| A6 = | −7.5364E−03 | −1.1840E−02 | −3.1936E−02 | −3.0281E−02 | 4.9439E−02 | 2.6339E−02 |
| A8 = | −3.5041E−02 | 2.3956E−02 | 1.4529E−01 | 5.4410E−03 | −3.9503E−02 | −9.2505E−03 |
| A10 = | −8.7072E−03 | 3.0972E−02 | −4.4670E−02 | 8.2564E−03 | 2.1355E−02 | 2.2432E−03 |
| A12 = | 1.0988E−02 | −6.6598E−03 | −1.1205E−02 | −1.5274E−03 | −5.9538E−03 | −3.5437E−04 |
| A14 = | 6.8306E−02 | −2.3278E−03 | 2.8965E−03 | −2.0470E−03 | 8.3970E−04 | 3.2368E−05 |
| A16 = | −3.9537E−02 | — | 6.0559E−04 | 7.9607E−04 | −4.8857E−05 | −1.2926E−06 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

3rd Embodiment

| f [mm] | 3.27 | (R3 + R4)/(R3 − R4) | −0.27 |
|---|---|---|---|
| Fno | 2.20 | (R5 + R6)/(R5 − R6) | 0.91 |
| HFOV [deg.] | 41.0 | (R9 − R10)/(R9 + R10) | −0.16 |
| Nmax | 1.661 | f2/f1 | 0.13 |
| V5 | 20.4 | |f/f1| + |f/f6| | 0.45 |
| (V3 + V5)/V2 | 0.78 | SD/TD | 1.00 |
| CT6/CT2 | 1.122 | TL/ImgH | 1.65 |
| f/R1 | 0.61 | TL [mm] | 4.87 |
| |f/R1| + |f/R2| | 0.96 | | |

4th Embodiment

Figure 7:
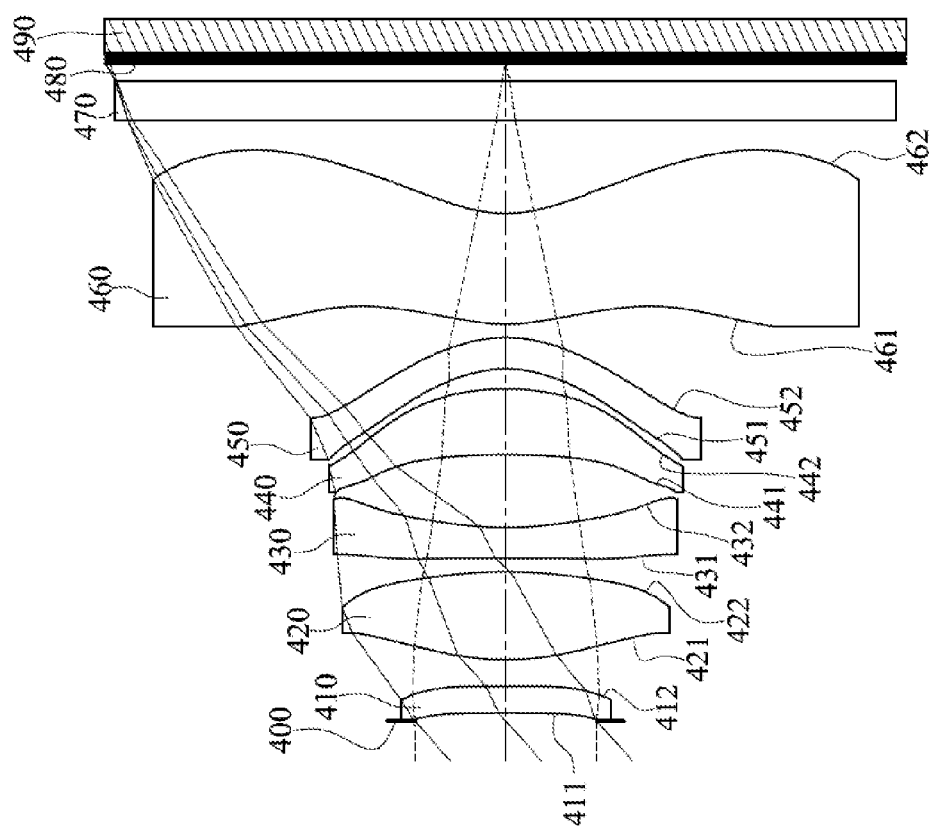
FIG. 7 is a schematic view of an image capturing unit according to the 4th embodiment of the present disclosure.
Figure 8:
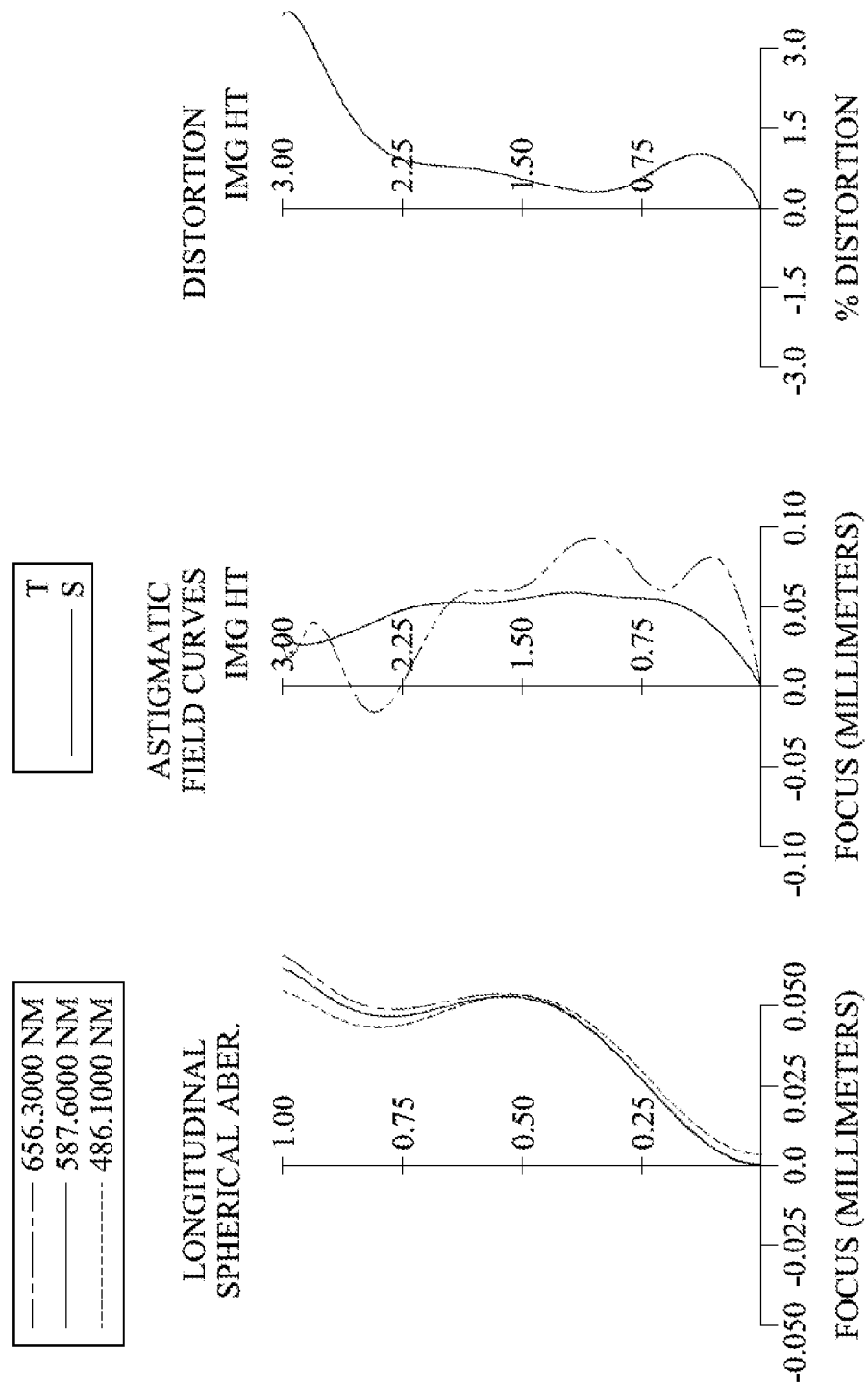
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the photographing lens system (its reference numeral is omitted) of the present disclosure and an image sensor 490. The photographing lens system includes, in order from an object side to an image side, an aperture stop 400, a first lens element 410, a second lens element 420, a third lens element 430, a fourth lens element 440, a fifth lens element 450, a sixth lens element 460, an IR-cut filter 470 and an image surface 480, wherein the photographing lens system has a total of six lens elements (410-460). There is an air gap in the paraxial region between every two of the first lens element 410, the second lens element 420, the third lens element 430, the fourth lens element 440, the fifth lens element 450 and the sixth lens element 460 that are adjacent to each other.

The first lens element 410 with negative refractive power has an object-side surface 411 being concave and an image-side surface 412 being concave. The first lens element 410 is made of plastic material and has the object-side surface 411 and the image-side surface 412 being both aspheric. The image-side surface 412 of the first lens element 410 has at least one inflection point.

The second lens element 420 with positive refractive power has an object-side surface 421 being convex and an image-side surface 422 being convex. The second lens element 420 is made of plastic material and has the object-side surface 421 and the image-side surface 422 being both aspheric.

The third lens element 430 with negative refractive power has an object-side surface 431 being convex and an image-side surface 432 being concave. The third lens element 430 is made of plastic material and has the object-side surface 431 and the image-side surface 432 being both aspheric.

The fourth lens element 440 with positive refractive power has an object-side surface 441 being concave and an image-side surface 442 being convex. The fourth lens element 440 is made of plastic material and has the object-side surface 441 and the image-side surface 442 being both aspheric.

The fifth lens element 450 with negative refractive power has an object-side surface 451 being concave and an image-side surface 452 being convex. The fifth lens element 450 is made of plastic material and has the object-side surface 451 and the image-side surface 452 being both aspheric.

The sixth lens element 460 with negative refractive power has an object-side surface 461 being convex and an image-side surface 462 being concave. The sixth lens element 460 is made of plastic material and has the object-side surface 461 and the image-side surface 462 being both aspheric. Both the object-side surface 461 and the image-side surface 462 of the sixth lens element 460 have at least one inflection point.

The IR-cut filter 470 is made of glass and located between the sixth lens element 460 and the image surface 480, and will not affect the focal length of the photographing lens system. The image sensor 490 is disposed on or near the image surface 480 of the photographing lens system.

In this embodiment, the second lens element 420 has the strongest refractive power among all lens elements of the photographing lens system. That is, the refractive power of the second lens element 420 has the largest absolute value among all lens elements (410-460) of the photographing lens system. Since the refractive power of a lens element is inversely related to its focal length, the second lens element 420 has the largest absolute value of refractive power as shown in the TABLE 7 below by having the smallest focal length value (|f2|=2.35).

The detailed optical data of the 4th embodiment are shown in Table 7 and the aspheric surface data are shown in Table 8 below.

TABLE 7

4th Embodiment
f = 3.21 mm, Fno = 2.35, HFOV = 41.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | 0.060 | | | | |
| 2 | Lens 1 | −245.761 | (ASP) | 0.200 | Plastic | 1.535 | 55.7 | −62.38 |
| 3 | | 38.629 | (ASP) | 0.200 | | | | |
| 4 | Lens 2 | 1.952 | (ASP) | 0.661 | Plastic | 1.535 | 55.7 | 2.35 |
| 5 | | −3.103 | (ASP) | 0.100 | | | | |
| 6 | Lens 3 | 36.569 | (ASP) | 0.232 | Plastic | 1.640 | 23.3 | −3.84 |
| 7 | | 2.297 | (ASP) | 0.548 | | | | |
| 8 | Lens 4 | −6.683 | (ASP) | 0.494 | Plastic | 1.544 | 55.9 | 4.99 |
| 9 | | −1.981 | (ASP) | 0.152 | | | | |
| 10 | Lens 5 | −0.877 | (ASP) | 0.235 | Plastic | 1.661 | 20.4 | −15.60 |
| 11 | | −1.061 | (ASP) | 0.100 | | | | |
| 12 | Lens 6 | 1.339 | (ASP) | 0.831 | Plastic | 1.544 | 55.9 | −19.42 |
| 13 | | 0.929 | (ASP) | 0.700 | | | | |
| 14 | IR-cut filter | Plano | | 0.300 | Glass | 1.517 | 64.2 | — |
| 15 | | Plano | | 0.126 | | | | |
| 16 | Image | Plano | | — | | | | |

Note:
Reference wavelength is 587.6 nm (d-line).

TABLE 8

Aspheric Coefficients

| Surface # | 2 | 3 | 4 | 5 | 6 | 7 |
|---|---|---|---|---|---|---|
| k = | −9.0000E+01 | −9.0000E+01 | −1.3117E+00 | −7.1624E+01 | −9.0000E+01 | −2.6643E+01 |
| A4 = | −1.8844E−01 | −2.9105E−01 | −5.7011E−02 | −7.7448E−02 | −1.2956E−01 | −1.6066E−02 |
| A6 = | −8.7305E−02 | −8.0384E−02 | −7.6116E−02 | 1.1455E−01 | 1.9260E−01 | 9.5234E−04 |
| A8 = | 6.5247E−02 | 2.1605E−01 | 9.5191E−02 | −9.7981E−02 | 1.2390E−01 | 1.5244E−01 |
| A10 = | −3.2330E−03 | −1.1871E−01 | −3.5613E−02 | −2.9077E−02 | −1.2677E−01 | −1.9000E−01 |
| A12 = | −9.1908E−02 | — | — | 6.2207E−02 | 5.9230E−02 | 1.0365E−01 |
| A14 = | 9.7886E−02 | — | — | −2.1144E−02 | −7.2536E−03 | −2.4726E−02 |

| Surface # | 8 | 9 | 10 | 11 | 12 | 13 |
|---|---|---|---|---|---|---|
| k = | −3.4518E+00 | 9.3187E−01 | −4.6853E+00 | −5.4168E−01 | −1.3906E+01 | −4.8937E+00 |
| A4 = | −6.8239E−02 | −8.0651E−02 | −1.6795E−01 | 1.6335E−01 | −8.5698E−02 | −4.5092E−02 |
| A6 = | 2.6766E−03 | −1.6651E−02 | −2.6194E−02 | −2.5620E−02 | 4.9418E−02 | 2.0528E−02 |

TABLE 8-continued

| Aspheric Coefficients | | | | | | |
|---|---|---|---|---|---|---|
| A8 = | −4.9058E−02 | 1.6941E−02 | 1.5064E−01 | 4.0560E−03 | −4.0377E−02 | −8.6045E−03 |
| A10 = | −2.0331E−02 | 2.9677E−02 | −4.7476E−02 | 8.9640E−03 | 2.1111E−02 | 2.2616E−03 |
| A12 = | 7.3729E−03 | −5.7700E−03 | −1.2787E−02 | −9.4317E−04 | −5.9175E−03 | −3.6352E−04 |
| A14 = | 7.0103E−02 | −1.5956E−03 | 2.5068E−03 | −1.7585E−03 | 8.5586E−04 | 3.2835E−05 |
| A16 = | −3.4023E−02 | — | 8.9057E−04 | 7.8659E−04 | −5.0907E−05 | −1.2702E−06 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 3.21 | (R3 + R4)/(R3 − R4) | −0.23 |
| Fno | 2.35 | (R5 + R6)/(R5 − R6) | 1.13 |
| HFOV [deg.] | 41.8 | (R9 − R10)/(R9 + R10) | −0.09 |
| Nmax | 1.661 | f2/f1 | −0.04 |
| V5 | 20.4 | |f/f1| + |f/f6| | 0.22 |
| (V3 + V5)/V2 | 0.78 | SD/TD | 1.02 |
| CT6/CT2 | 1.257 | TL/ImgH | 1.63 |
| f/R1 | −0.01 | TL [mm] | 4.88 |
| |f/R1| + |f/R2| | 0.10 | | |

5th Embodiment

Figure 9:
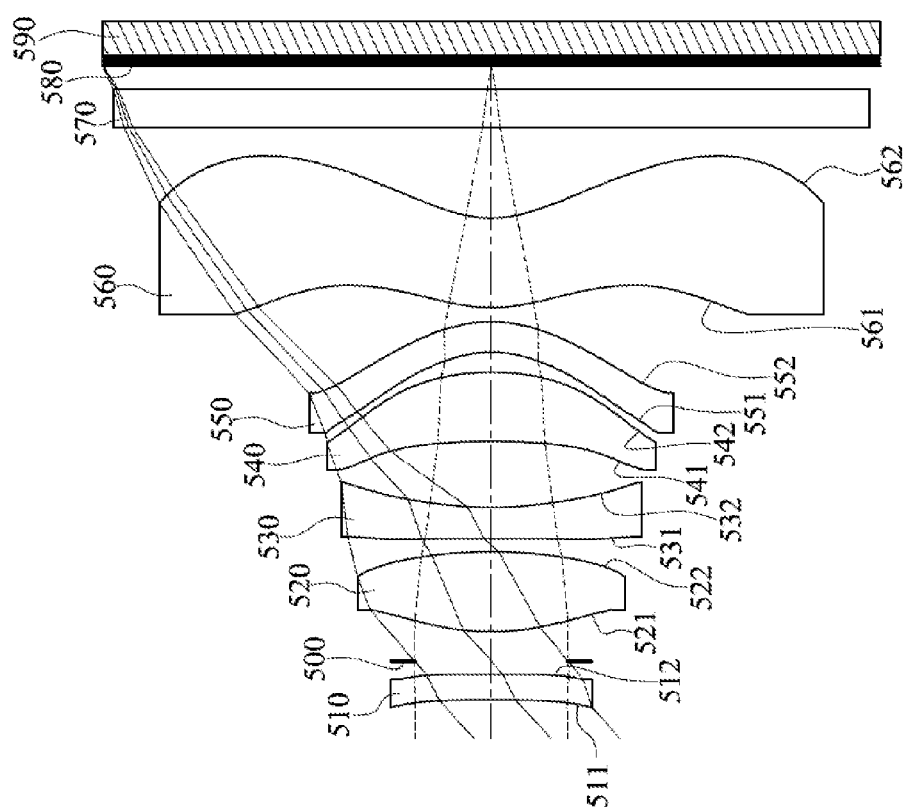
FIG. 9 is a schematic view of an image capturing unit according to the 5th embodiment of the present disclosure.
Figure 10:
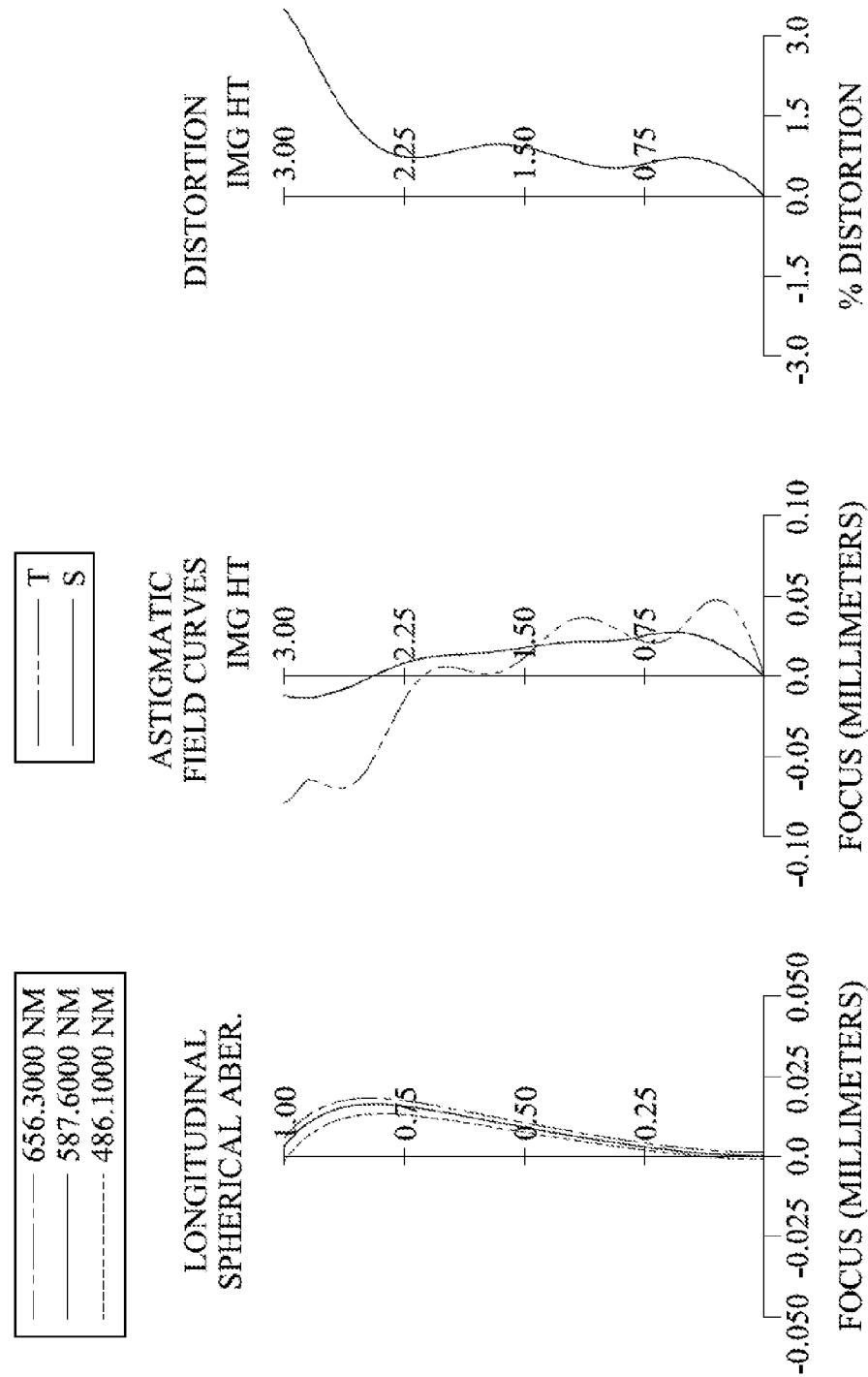
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the photographing lens system (its reference numeral is omitted) of the present disclosure and an image sensor 590. The photographing lens system includes, in order from an object side to an image side, a first lens element 510, an aperture stop 500, a second lens element 520, a third lens element 530, a fourth lens element 540, a fifth lens element 550, a sixth lens element 560, an IR-cut filter 570 and an image surface 580, wherein the photographing lens system has a total of six lens elements (510-560). There is an air gap in the paraxial region between every two of the first lens element 510, the second lens element 520, the third lens element 530, the fourth lens element 540, the fifth lens element 550 and the sixth lens element 560 that are adjacent to each other.

The first lens element 510 with negative refractive power has an object-side surface 511 being concave and an image-side surface 512 being concave. The first lens element 510 is made of plastic material and has the object-side surface 511 and the image-side surface 512 being both aspheric. The image-side surface 512 of the first lens element 510 has at least one inflection point.

The second lens element 520 with positive refractive power has an object-side surface 521 being convex and an image-side surface 522 being convex. The second lens element 520 is made of plastic material and has the object-side surface 521 and the image-side surface 522 being both aspheric.

The third lens element 530 with negative refractive power has an object-side surface 531 being convex and an image-side surface 532 being concave. The third lens element 530 is made of plastic material and has the object-side surface 531 and the image-side surface 532 being both aspheric.

The fourth lens element 540 with positive refractive power has an object-side surface 541 being concave and an image-side surface 542 being convex. The fourth lens element 540 is made of plastic material and has the object-side surface 541 and the image-side surface 542 being both aspheric.

The fifth lens element 550 with negative refractive power has an object-side surface 551 being concave and an image-side surface 552 being convex. The fifth lens element 550 is made of plastic material and has the object-side surface 551 and the image-side surface 552 being both aspheric.

The sixth lens element 560 with negative refractive power has an object-side surface 561 being convex and an image-side surface 562 being concave. The sixth lens element 560 is made of plastic material and has the object-side surface 561 and the image-side surface 562 being both aspheric. Both the object-side surface 561 and the image-side surface 562 of the sixth lens element 560 have at least one inflection point.

The IR-cut filter 570 is made of glass and located between the sixth lens element 560 and the image surface 580, and will not affect the focal length of the photographing lens system. The image sensor 590 is disposed on or near the image surface 580 of the photographing lens system.

In this embodiment, the second lens element 520 has the strongest refractive power among all lens elements of the photographing lens system. That is, the refractive power of the second lens element 520 has the largest absolute value among all lens elements (510-560) of the photographing lens system. Since the refractive power of a lens element is inversely related to its focal length, the second lens element 520 has the largest absolute value of refractive power as shown in the TABLE 9 below by having the smallest focal length value (|f2|=2.36).

The detailed optical data of the 5th embodiment are shown in Table 9 and the aspheric surface data are shown in Table 10 below.

TABLE 9

5th Embodiment
f = 3.16 mm, Fno = 2.70, HFOV = 42.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −100.884 | (ASP) | 0.200 | Plastic | 1.535 | 55.7 | −36.51 |
| 2 | | 24.236 | (ASP) | 0.100 | | | | |
| 3 | Ape. Stop | Plano | | 0.229 | | | | |
| 4 | Lens 2 | 1.882 | (ASP) | 0.619 | Plastic | 1.535 | 55.7 | 2.36 |
| 5 | | −3.393 | (ASP) | 0.100 | | | | |
| 6 | Lens 3 | 26.136 | (ASP) | 0.240 | Plastic | 1.640 | 23.3 | −4.26 |
| 7 | | 2.457 | (ASP) | 0.512 | | | | |
| 8 | Lens 4 | −6.103 | (ASP) | 0.536 | Plastic | 1.535 | 55.7 | 5.02 |
| 9 | | −1.923 | (ASP) | 0.155 | | | | |
| 10 | Lens 5 | −0.866 | (ASP) | 0.235 | Plastic | 1.640 | 23.3 | −13.28 |
| 11 | | −1.066 | (ASP) | 0.110 | | | | |
| 12 | Lens 6 | 1.148 | (ASP) | 0.692 | Plastic | 1.535 | 55.7 | −37.90 |
| 13 | | 0.858 | (ASP) | 0.700 | | | | |
| 14 | IR-cut filter | Plano | | 0.300 | Glass | 1.517 | 64.2 | — |
| 15 | | Plano | | 0.179 | | | | |
| 16 | Image | Plano | | — | | | | |

Note:
Reference wavelength is 587.6 nm (d-line).

TABLE 10

Aspheric Coefficients

| Surface # | 1 | 2 | 4 | 5 | 6 | 7 |
|---|---|---|---|---|---|---|
| k = | −9.0000E+01 | 8.5588E+00 | −1.0142E+00 | −4.4458E+01 | −7.9287E+01 | −2.0107E+01 |
| A4 = | −1.5513E−01 | −2.2916E−01 | −4.7366E−02 | −9.3977E−02 | −1.3623E−01 | −2.0534E−02 |
| A6 = | −5.6900E−02 | 3.4895E−03 | −6.1099E−02 | 1.0375E−01 | 1.8896E−01 | −1.2491E−03 |
| A8 = | 2.0437E−01 | 1.9964E−01 | 6.9461E−02 | −9.4067E−02 | 1.0595E−02 | 1.5135E−01 |
| A10 = | −1.5315E−01 | −2.1253E−01 | −4.9738E−02 | −2.9284E−02 | −1.2634E−01 | −1.9012E−01 |
| A12 = | −9.1905E−02 | — | — | 5.7991E−02 | 6.0854E−02 | 1.0356E−01 |
| A14 = | 9.7885E−02 | — | — | −2.3946E−02 | −7.3340E−03 | −2.4709E−02 |

| Surface # | 8 | 9 | 10 | 11 | 12 | 13 |
|---|---|---|---|---|---|---|
| k = | −1.6340E+01 | 9.0865E−01 | −4.6260E+00 | −5.4072E−01 | −8.6276E+00 | −3.9123E+00 |
| A4 = | −6.2213E−02 | −7.4445E−02 | −1.6384E−01 | 1.6560E−01 | −9.5989E−02 | −5.9718E−02 |
| A6 = | 4.3882E−03 | −7.7559E−03 | −2.8094E−02 | −2.4007E−02 | 4.7671E−02 | 2.3256E−02 |
| A8 = | −4.8351E−02 | 1.8166E−02 | 1.5037E−02 | 3.7319E−03 | −3.9926E−02 | −8.7862E−03 |
| A10 = | −1.9409E−02 | 2.8734E−02 | −4.6361E−02 | 9.1089E−03 | 2.1114E−02 | 2.2090E−03 |
| A12 = | 6.9680E−03 | −6.3193E−03 | −1.2751E−02 | −8.4586E−04 | −5.9157E−03 | −3.5658E−04 |
| A14 = | 6.9703E−02 | −1.7508E−03 | 2.4978E−03 | −1.7215E−03 | 8.5235E−04 | 3.3239E−05 |
| A16 = | −3.4312E−02 | — | 8.8930E−04 | 8.0427E−04 | −5.0303E−05 | −1.3518E−06 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 3.16 | (R3 + R4)/(R3 − R4) | −0.29 |
| Fno | 2.70 | (R5 + R6)/(R5 − R6) | 1.21 |
| HFOV [deg.] | 42.5 | (R9 − R10)/(R9 + R10) | −0.10 |
| Nmax | 1.640 | f2/f1 | −0.06 |
| V5 | 23.3 | |f/f1| + |f/f6| | 0.17 |
| (V3 + V5)/V2 | 0.83 | SD/TD | 0.92 |
| CT6/CT2 | 1.118 | TL/ImgH | 1.64 |
| f/R1 | −0.03 | TL [mm] | 4.91 |
| |f/R1| + |f/R2| | 0.16 | | |

6th Embodiment

Figure 11:
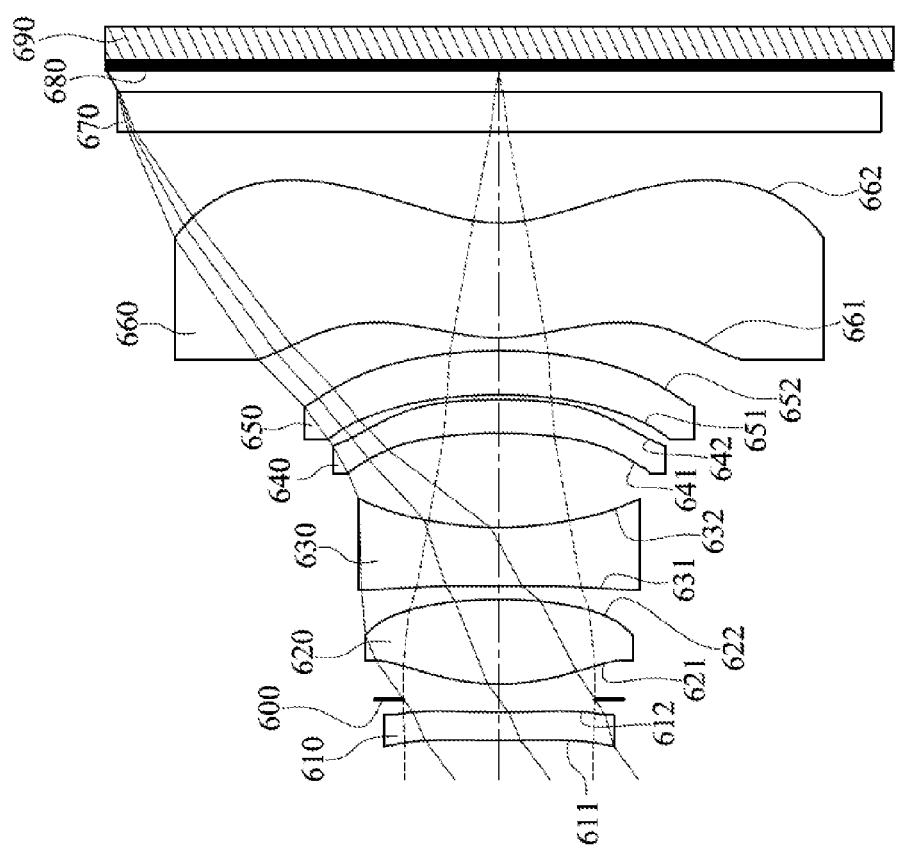
FIG. 11 is a schematic view of an image capturing unit according to the 6th embodiment of the present disclosure.
Figure 12:
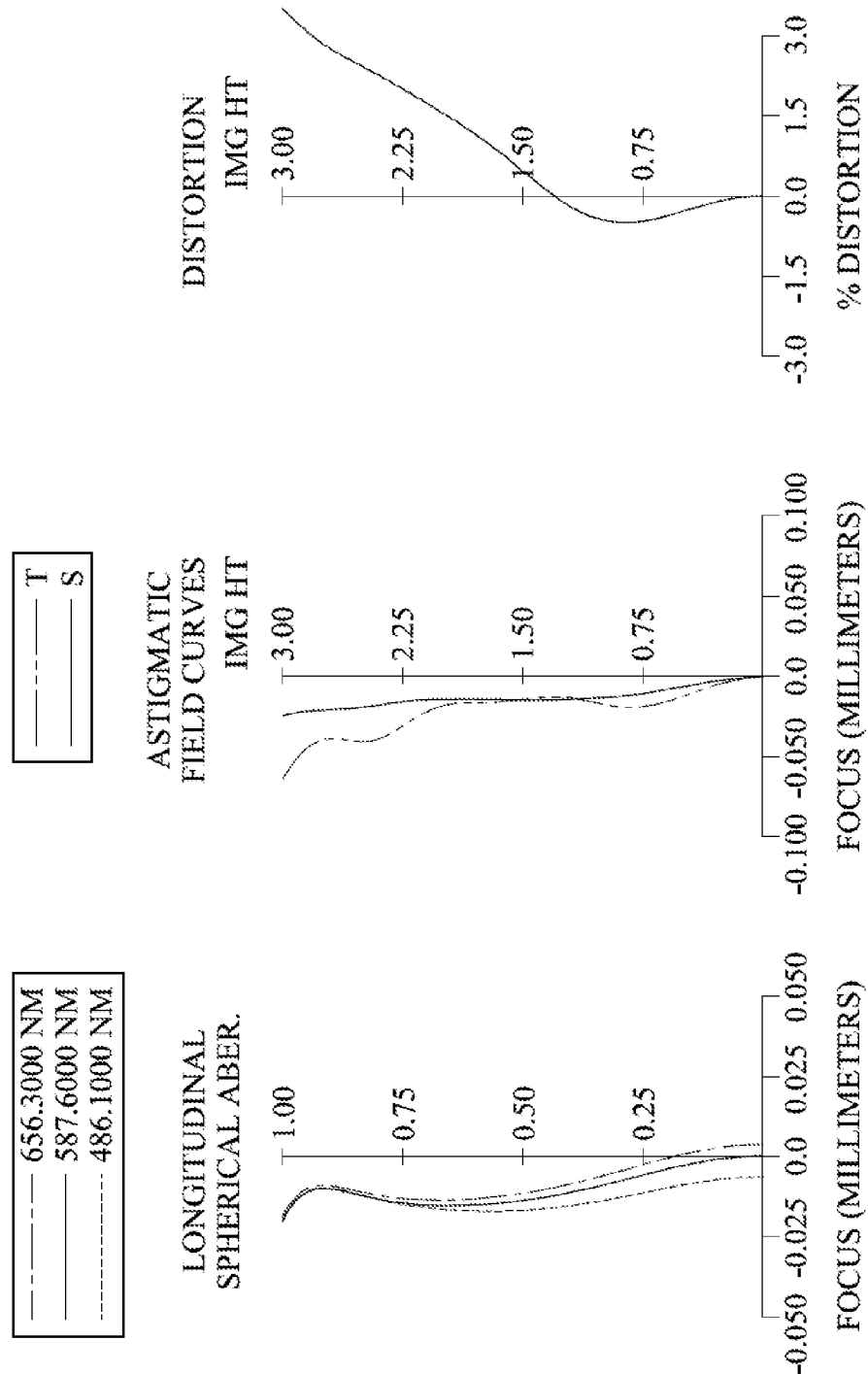
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the photographing lens system (its reference numeral is omitted) of the present disclosure and an image sensor 690. The photographing lens system includes, in order from an object side to an image side, a first lens element 610, an aperture stop 600, a second lens element 620, a third lens element 630, a fourth lens element 640, a fifth lens element 650, a sixth lens element 660, an IR-cut filter 670 and an image surface 680, wherein the photographing lens system has a total of six lens elements (610-660). There is an air gap in the paraxial region between every two of the first lens element 610, the second lens element 620, the third lens element 630, the fourth lens element 640, the fifth lens element 650 and the sixth lens element 660 that are adjacent to each other.

The first lens element 610 with negative refractive power has an object-side surface 611 being convex and an image-side surface 612 being concave. The first lens element 610 is made of plastic material and has the object-side surface 611 and the image-side surface 612 being both aspheric. Both the object-side surface 611 and the image-side surface 612 of the first lens element 610 have at least one inflection point.

The second lens element 620 with positive refractive power has an object-side surface 621 being convex and an image-side surface 622 being convex. The second lens element 620 is made of plastic material and has the object-side surface 621 and the image-side surface 622 being both aspheric.

The third lens element 630 with negative refractive power has an object-side surface 631 being convex and an image-side surface 632 being concave. The third lens element 630 is made of plastic material and has the object-side surface 631 and the image-side surface 632 being both aspheric.

The fourth lens element 640 with negative refractive power has an object-side surface 641 being concave and an image-side surface 642 being convex. The fourth lens element 640 is made of plastic material and has the object-side surface 641 and the image-side surface 642 being both aspheric.

The fifth lens element 650 with negative refractive power has an object-side surface 651 being concave and an image-side surface 652 being convex. The fifth lens element 650 is made of plastic material and has the object-side surface 651 and the image-side surface 652 being both aspheric.

The sixth lens element 660 with positive refractive power has an object-side surface 661 being convex and an image-side surface 662 being concave. The sixth lens element 660 is made of plastic material and has the object-side surface 661 and the image-side surface 662 being both aspheric. Both the object-side surface 661 and the image-side surface 662 of the sixth lens element 660 have at least one inflection point.

The IR-cut filter 670 is made of glass and located between the sixth lens element 660 and the image surface 680, and will not affect the focal length of the photographing lens system. The image sensor 690 is disposed on or near the image surface 680 of the photographing lens system.

In this embodiment, the second lens element 620 has the strongest refractive power among all lens elements of the photographing lens system. That is, the refractive power of the second lens element 620 has the largest absolute value among all lens elements (610-660) of the photographing lens system. Since the refractive power of a lens element is inversely related to its focal length, the second lens element 620 has the largest absolute value of refractive power as shown in the TABLE 11 below by having the smallest focal length value (|f2|=2.25).

The detailed optical data of the 6th embodiment are shown in Table 11 and the aspheric surface data are shown in Table 12 below.

TABLE 11

6th Embodiment
f = 3.89 mm, Fno = 2.70, HFOV = 36.8 deg.

| Surface # |  | Curvature Radius |  | Thickness | Material | Index | Abbe # | Focal Length |
|---|---|---|---|---|---|---|---|---|
| 0 | Object | Plano |  | Infinity |  |  |  |  |
| 1 | Lens 1 | 12.887 | (ASP) | 0.214 | Plastic | 1.535 | 55.7 | −17.86 |
| 2 |  | 5.455 | (ASP) | 0.100 |  |  |  |  |
| 3 | Ape. Stop | Plano |  | 0.117 |  |  |  |  |
| 4 | Lens 2 | 1.679 | (ASP) | 0.647 | Plastic | 1.535 | 55.7 | 2.25 |
| 5 |  | −3.692 | (ASP) | 0.100 |  |  |  |  |
| 6 | Lens 3 | 19.907 | (ASP) | 0.451 | Plastic | 1.640 | 23.3 | −4.59 |
| 7 |  | 2.534 | (ASP) | 0.721 |  |  |  |  |
| 8 | Lens 4 | −3.581 | (ASP) | 0.257 | Plastic | 1.535 | 55.7 | −22.84 |
| 9 |  | −5.192 | (ASP) | 0.037 |  |  |  |  |
| 10 | Lens 5 | −3.079 | (ASP) | 0.337 | Plastic | 1.640 | 23.3 | −103.31 |
| 11 |  | −3.367 | (ASP) | 0.100 |  |  |  |  |
| 12 | Lens 6 | 1.380 | (ASP) | 0.879 | Plastic | 1.535 | 55.7 | 38.56 |
| 13 |  | 1.151 | (ASP) | 0.700 |  |  |  |  |
| 14 | IR-cut filter | Plano |  | 0.300 | Glass | 1.517 | 64.2 | — |
| 15 |  | Plano |  | 0.166 |  |  |  |  |
| 16 | Image | Plano |  | — |  |  |  |  |

Note:
Reference wavelength is 587.6 nm (d-line).

TABLE 12

Aspheric Coefficients

| Surface # | 1 | 2 | 4 | 5 | 6 | 7 |
|---|---|---|---|---|---|---|
| k = | −8.7251E+01 | −1.7779E+01 | −1.4597E+00 | −1.2422E+01 | −9.0000E+01 | −7.7114E+00 |
| A4 = | −1.4330E−01 | −2.2231E−01 | −5.4671E−02 | −1.2484E−01 | −1.6710E−01 | −1.5962E−02 |
| A6 = | −1.9046E−02 | 3.5246E−02 | −1.7875E−02 | 9.4619E−02 | 1.6467E−01 | −3.1341E−03 |

TABLE 12-continued

| Aspheric Coefficients | | | | | |
|---|---|---|---|---|---|
| A8 = | 8.5666E−02 | 1.1766E−01 | 4.5950E−02 | −8.4095E−02 | 9.4215E−03 | 1.5271E−01 |
| A10 = | −8.3949E−03 | −9.6455E−02 | −8.7186E−02 | −3.1584E−02 | −1.1881E−01 | −1.8831E−01 |
| A12 = | −9.6049E−02 | — | — | 3.5299E−02 | 6.5607E−02 | 1.0691E−01 |
| A14 = | 5.8185E−02 | — | — | −2.3935E−02 | −3.6252E−03 | −2.7535E−02 |

| Surface # | 8 | 9 | 10 | 11 | 12 | 13 |
|---|---|---|---|---|---|---|
| k = | −4.6994E+01 | 6.2328E+00 | −8.8525E+01 | 1.6159E+00 | −1.0713E+01 | −5.6410E+00 |
| A4 = | −8.2084E−02 | −1.5565E−01 | −9.7199E−02 | 2.3314E−02 | −1.1986E−01 | −5.4213E−02 |
| A6 = | −1.8353E−02 | 2.9002E−03 | −7.5856E−02 | −3.4616E−02 | 4.9925E−02 | 2.0576E−02 |
| A8 = | −3.7407E−02 | 1.6382E−02 | 1.3627E−01 | 2.4167E−03 | −3.9635E−02 | −8.4859E−03 |
| A10 = | −9.7340E−03 | 2.6210E−02 | −4.6293E−02 | 8.3492E−03 | 2.1234E−02 | 2.2800E−03 |
| A12 = | 8.3477E−03 | −7.3167E−03 | −1.1375E−02 | −1.2961E−03 | −5.8951E−03 | −3.7061E−04 |
| A14 = | 6.6073E−02 | −1.8921E−03 | 3.2737E−03 | −1.9760E−03 | 8.5201E−04 | 3.2301E−05 |
| A16 = | −3.9202E−02 | — | 1.1707E−03 | 6.7089E−04 | −5.2015E−05 | −1.1702E−06 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 3.89 | (R3 + R4)/(R3 − R4) | −0.37 |
| Fno | 2.70 | (R5 + R6)/(R5 − R6) | 1.29 |
| HFOV [deg.] | 36.8 | (R9 − R10)/(R9 + R10) | −0.04 |
| Nmax | 1.640 | f2/f1 | −0.13 |
| V5 | 23.3 | |f/f1| + |f/f6| | 0.32 |
| (V3 + V5)/V2 | 0.83 | SD/TD | 0.92 |
| CT6/CT2 | 1.359 | TL/ImgH | 1.71 |
| f/R1 | 0.30 | TL [mm] | 5.13 |
| |f/R1| + |f/R2| | 1.01 | | |

7th Embodiment

Figure 13:
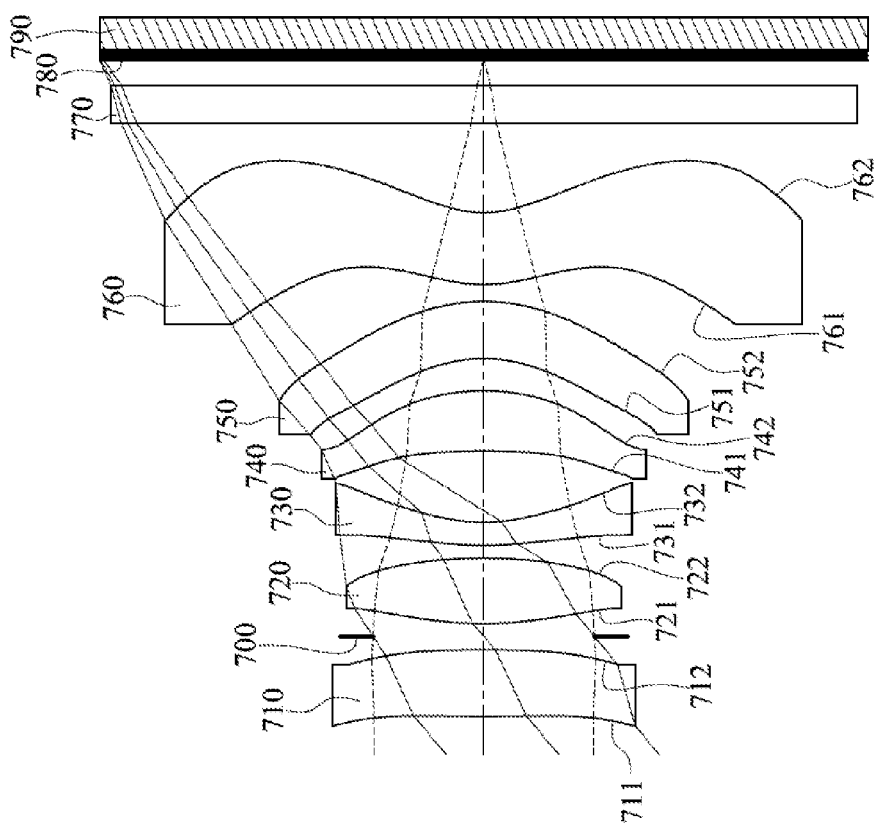
FIG. 13 is a schematic view of an image capturing unit according to the 7th embodiment of the present disclosure.
Figure 14:
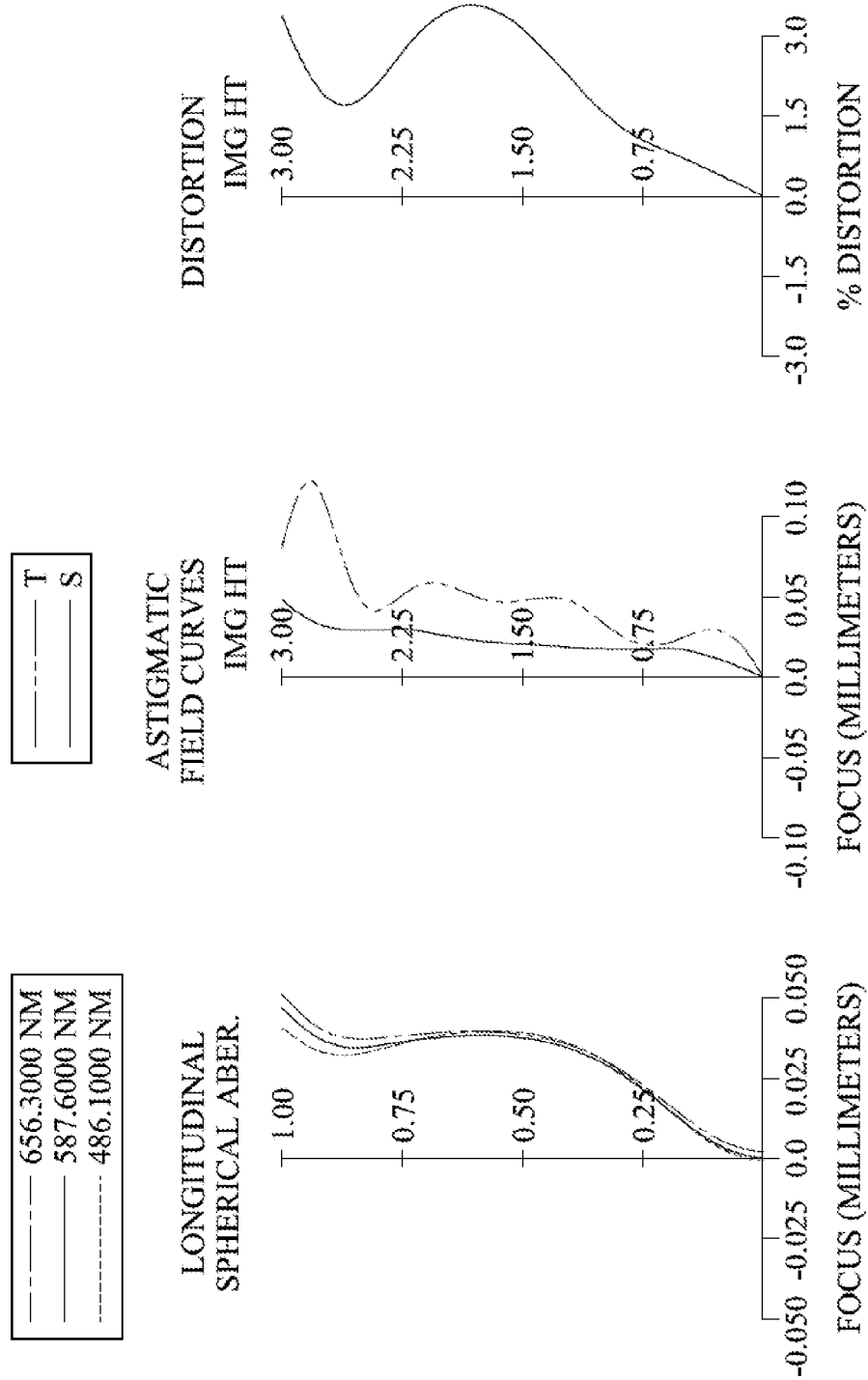
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the photographing lens system (its reference numeral is omitted) of the present disclosure and an image sensor 790. The photographing lens system includes, in order from an object side to an image side, a first lens element 710, an aperture stop 700, a second lens element 720, a third lens element 730, a fourth lens element 740, a fifth lens element 750, a sixth lens element 760, an IR-cut filter 770 and an image surface 780, wherein the photographing lens system has a total of six lens elements (710-760). There is an air gap in the paraxial region between every two of the first lens element 710, the second lens element 720, the third lens element 730, the fourth lens element 740, the fifth lens element 750 and the sixth lens element 760 that are adjacent to each other.

The first lens element 710 with positive refractive power has an object-side surface 711 being convex and an image-side surface 712 being convex. The first lens element 710 is made of plastic material and has the object-side surface 711 and the image-side surface 712 being both aspheric. The object-side surface 711 of the first lens element 710 has at least one inflection point.

The second lens element 720 with positive refractive power has an object-side surface 721 being convex and an image-side surface 722 being convex. The second lens element 720 is made of plastic material and has the object-side surface 721 and the image-side surface 722 being both aspheric.

The third lens element 730 with negative refractive power has an object-side surface 731 being convex and an image-side surface 732 being concave. The third lens element 730 is made of plastic material and has the object-side surface 731 and the image-side surface 732 being both aspheric.

The fourth lens element 740 with positive refractive power has an object-side surface 741 being concave and an image-side surface 742 being convex. The fourth lens element 740 is made of plastic material and has the object-side surface 741 and the image-side surface 742 being both aspheric.

The fifth lens element 750 with negative refractive power has an object-side surface 751 being concave and an image-side surface 752 being convex. The fifth lens element 750 is made of plastic material and has the object-side surface 751 and the image-side surface 752 being both aspheric.

The sixth lens element 760 with negative refractive power has an object-side surface 761 being convex and an image-side surface 762 being concave. The sixth lens element 760 is made of plastic material and has the object-side surface 761 and the image-side surface 762 being both aspheric. Both the object-side surface 761 and the image-side surface 762 of the sixth lens element 760 have at least one inflection point.

The IR-cut filter 770 is made of glass and located between the sixth lens element 760 and the image surface 780, and will not affect the focal length of the photographing lens system. The image sensor 790 is disposed on or near the image surface 780 of the photographing lens system.

In this embodiment, the second lens element 720 has the strongest refractive power among all lens elements of the photographing lens system. That is, the refractive power of the second lens element 720 has the largest absolute value among all lens elements (710-760) of the photographing lens system. Since the refractive power of a lens element is inversely related to its focal length, the second lens element 720 has the largest absolute value of refractive power as shown in the TABLE 13 below by having the smallest focal length value (|f2|=3.21).

The detailed optical data of the 7th embodiment are shown in Table 13 and the aspheric surface data are shown in Table 14 below.

TABLE 13

7th Embodiment
f = 3.44 mm, Fno = 2.00, HFOV = 40.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 13.730 | (ASP) | 0.522 | Plastic | 1.535 | 55.7 | 15.96 |
| 2 | | −22.266 | (ASP) | 0.106 | | | | |
| 3 | Ape. Stop | Plano | | 0.100 | | | | |
| 4 | Lens 2 | 2.743 | (ASP) | 0.513 | Plastic | 1.544 | 55.9 | 3.21 |
| 5 | | −4.507 | (ASP) | 0.100 | | | | |
| 6 | Lens 3 | 2.313 | (ASP) | 0.180 | Plastic | 1.640 | 23.3 | −5.14 |
| 7 | | 1.316 | (ASP) | 0.558 | | | | |
| 8 | Lens 4 | −6.832 | (ASP) | 0.473 | Plastic | 1.544 | 55.9 | 4.09 |
| 9 | | −1.720 | (ASP) | 0.254 | | | | |
| 10 | Lens 5 | −1.021 | (ASP) | 0.446 | Plastic | 1.661 | 20.4 | −9.60 |
| 11 | | −1.429 | (ASP) | 0.132 | | | | |
| 12 | Lens 6 | 1.154 | (ASP) | 0.564 | Plastic | 1.544 | 55.9 | −16.76 |
| 13 | | 0.848 | (ASP) | 0.700 | | | | |
| 14 | IR-cut filter | Plano | | 0.300 | Glass | 1.517 | 64.2 | — |
| 15 | | Plano | | 0.194 | | | | |
| 16 | Image | Plano | | — | | | | |

Note:
Reference wavelength is 587.6 nm (d-line).

TABLE 14

Aspheric Coefficients

| Surface # | 1 | 2 | 4 | 5 | 6 | 7 |
|---|---|---|---|---|---|---|
| k = | −9.0000E+01 | −8.0831E+01 | −5.3686E+00 | −7.9993E+00 | −3.0756E+01 | −8.5385E+00 |
| A4 = | −7.0323E−02 | −1.3750E−01 | −5.0373E−02 | −1.0528E−01 | −1.3882E−01 | 1.8332E−02 |
| A6 = | 1.1254E−02 | 6.0854E−02 | −2.9750E−02 | 1.1434E−01 | 1.8155E−01 | −1.6457E−02 |
| A8 = | −3.4903E−02 | 1.2836E−02 | 1.3016E−01 | −5.6984E−02 | −1.8337E−02 | 1.4282E−01 |
| A10 = | 4.9095E−02 | −1.4779E−02 | −9.4092E−02 | −4.9244E−02 | −1.2863E−01 | −2.0036E−01 |
| A12 = | −2.3792E−02 | — | — | 6.7473E−02 | 6.1823E−02 | 1.0421E−01 |
| A14 = | 3.4854E−03 | — | — | −3.6385E−02 | −4.4566E−05 | −2.1189E−02 |

| Surface # | 8 | 9 | 10 | 11 | 12 | 13 |
|---|---|---|---|---|---|---|
| k = | 1.5508E+01 | 4.6558E−01 | −5.7831E+00 | −3.1620E−01 | −6.8539E+00 | −3.9331E+00 |
| A4 = | −9.0103E−02 | −3.2723E−02 | −1.2404E−01 | 8.4434E−02 | −1.6738E−01 | −8.4305E−02 |
| A6 = | −3.3832E−03 | −2.3859E−02 | −1.8293E−02 | −3.8027E−02 | 6.4983E−02 | 3.2449E−02 |
| A8 = | −8.4255E−03 | 2.6908E−02 | 1.2734E−01 | 1.2866E−02 | −3.9178E−02 | −1.0594E−02 |
| A10 = | −4.7458E−03 | 3.1192E−02 | −4.6960E−02 | 1.0154E−02 | 2.0834E−02 | 2.3777E−03 |
| A12 = | 1.3369E−02 | −6.7333E−03 | −8.4690E−03 | −1.7348E−03 | −5.9698E−03 | −3.6717E−04 |
| A14 = | 6.7531E−02 | −1.1941E−03 | 2.3847E−03 | −2.3090E−03 | 8.2300E−04 | 3.3552E−05 |
| A16 = | −4.6265E−02 | — | 5.4088E−04 | 5.9141E−04 | −4.2732E−05 | −1.2979E−06 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 3.44 | (R3 + R4)/(R3 − R4) | −0.24 |
| Fno | 2.00 | (R5 + R6)/(R5 − R6) | 3.64 |

-continued

| 7th Embodiment | | | |
|---|---|---|---|
| HFOV [deg.] | 40.0 | (R9 − R10)/(R9 + R10) | −0.17 |
| Nmax | 1.661 | f2/f1 | 0.20 |
| V5 | 20.4 | \|f/f1\| + \|f/f6\| | 0.42 |
| (V3 + V5)/V2 | 0.78 | SD/TD | 0.84 |
| CT6/CT2 | 1.099 | TL/ImgH | 1.71 |
| f/R1 | 0.25 | TL [mm] | 5.14 |
| \|f/R1\| + \|f/R2\| | 0.40 | | |

8th Embodiment

Figure 15:
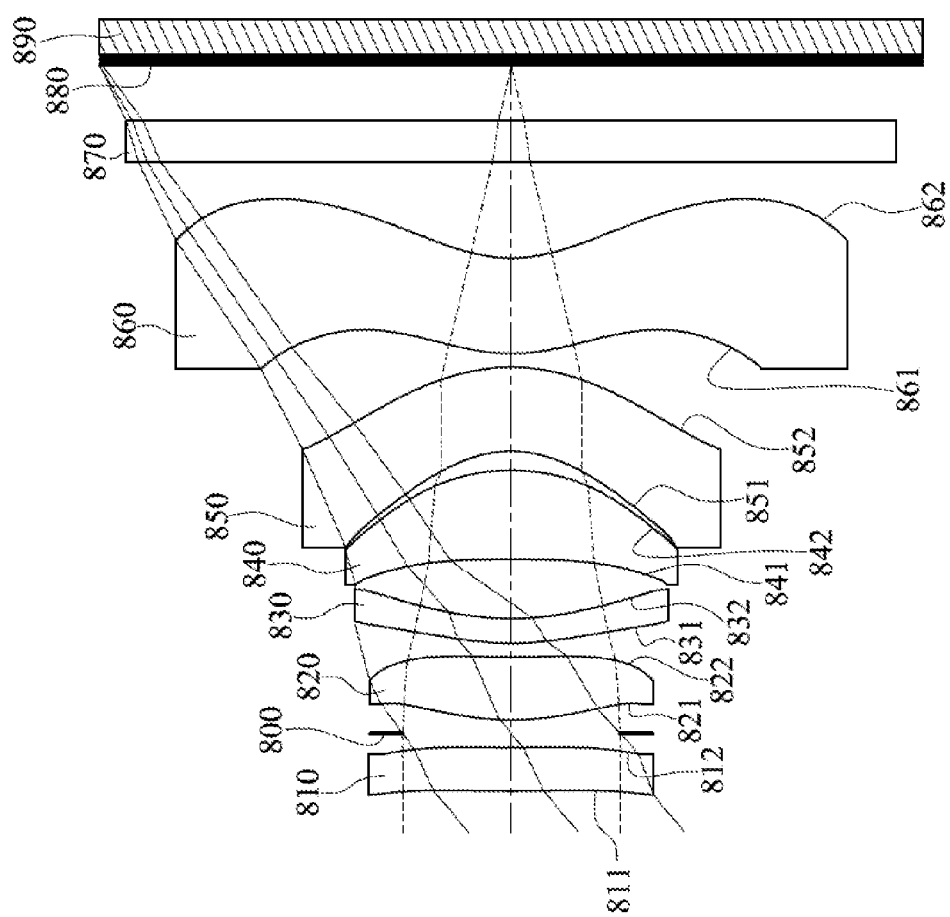
FIG. 15 is a schematic view of an image capturing unit according to the 8th embodiment of the present disclosure.

FIG. 15 is a schematic view of an image capturing unit according to the 8th embodiment of the present disclosure.

Figure 16:
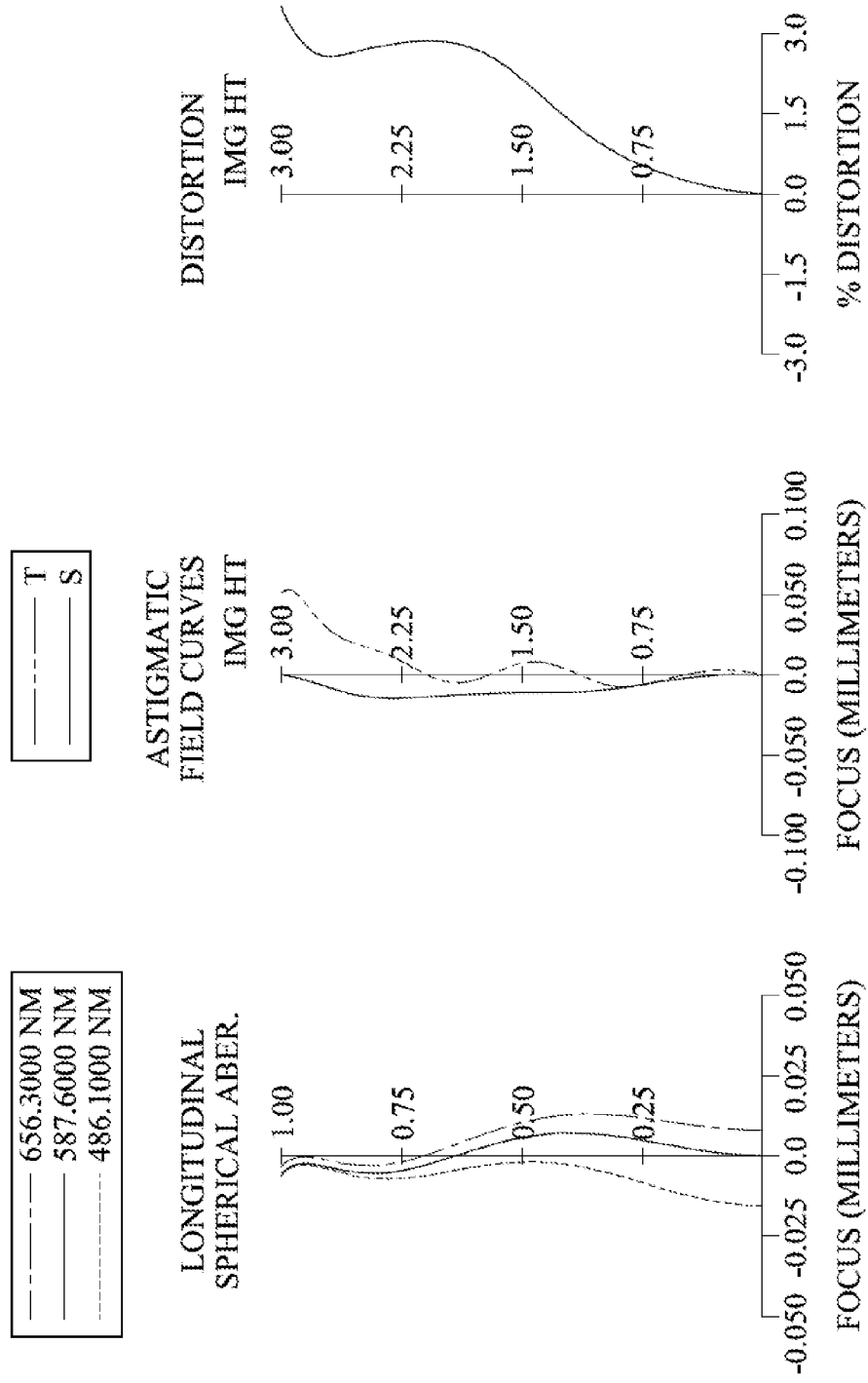
FIG. 16 shows spherical aberration curves, astigmatic field curves and a distortion curve of the image capturing unit according to the 8th embodiment.

FIG. 16 shows, in order from left to right, spherical aberration curves, astigmatic field curves and a distortion curve of the image capturing unit according to the 8th embodiment. In FIG. 15, the image capturing unit includes the photographing lens system (its reference numeral is omitted) of the present disclosure and an image sensor 890. The photographing lens system includes, in order from an object side to an image side, a first lens element 810, an aperture stop 800, a second lens element 820, a third lens element 830, a fourth lens element 840, a fifth lens element 850, a sixth lens element 860, an IR-cut filter 870 and an image surface 880, wherein the photographing lens system has a total of six lens elements (810-860). There is an air gap in the paraxial region between every two of the first lens element 810, the second lens element 820, the third lens element 830, the fourth lens element 840, the fifth lens element 850 and the sixth lens element 860 that are adjacent to each other.

The first lens element 810 with negative refractive power has an object-side surface 811 being convex and an image-side surface 812 being concave. The first lens element 810 is made of plastic material and has the object-side surface 811 and the image-side surface 812 being both aspheric. Both the object-side surface 811 and the image-side surface 812 of the first lens element 810 have at least one inflection point.

The second lens element 820 with positive refractive power has an object-side surface 821 being convex and an image-side surface 822 being concave. The second lens element 820 is made of plastic material and has the object-side surface 821 and the image-side surface 822 being both aspheric.

The third lens element 830 with positive refractive power has an object-side surface 831 being convex and an image-side surface 832 being concave. The third lens element 830 is made of plastic material and has the object-side surface 831 and the image-side surface 832 being both aspheric.

The fourth lens element 840 with positive refractive power has an object-side surface 841 being concave and an image-side surface 842 being convex. The fourth lens element 840 is made of plastic material and has the object-side surface 841 and the image-side surface 842 being both aspheric.

The fifth lens element 850 with negative refractive power has an object-side surface 851 being concave and an image-side surface 852 being convex. The fifth lens element 850 is made of plastic material and has the object-side surface 851 and the image-side surface 852 being both aspheric.

The sixth lens element 860 with negative refractive power has an object-side surface 861 being convex and an image-side surface 862 being concave. The sixth lens element 860 is made of plastic material and has the object-side surface 861 and the image-side surface 862 being both aspheric. Both the object-side surface 861 and the image-side surface 862 of the sixth lens element 860 have at least one inflection point.

The IR-cut filter 870 is made of glass and located between the sixth lens element 860 and the image surface 880, and will not affect the focal length of the photographing lens system. The image sensor 890 is disposed on or near the image surface 880 of the photographing lens system.

The detailed optical data of the 8th embodiment are shown in Table 15 and the aspheric surface data are shown in Table 16 below.

TABLE 15

8th Embodiment
f = 3.47 mm, Fno = 2.20, HFOV = 39.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 13.849 | (ASP) | 0.317 | Plastic | 1.535 | 55.7 | −1582.54 |
| 2 | | 13.518 | (ASP) | 0.103 | | | | |
| 3 | Ape. Stop | Plano | | 0.100 | | | | |
| 4 | Lens 2 | 2.006 | (ASP) | 0.458 | Plastic | 1.544 | 55.9 | 4.74 |
| 5 | | 8.306 | (ASP) | 0.100 | | | | |
| 6 | Lens 3 | 1.994 | (ASP) | 0.180 | Plastic | 1.640 | 23.3 | 100.23 |
| 7 | | 1.985 | (ASP) | 0.432 | | | | |
| 8 | Lens 4 | −11.311 | (ASP) | 0.649 | Plastic | 1.544 | 55.9 | 3.00 |
| 9 | | −1.454 | (ASP) | 0.140 | | | | |
| 10 | Lens 5 | −0.813 | (ASP) | 0.612 | Plastic | 1.661 | 20.4 | −5.27 |
| 11 | | −1.377 | (ASP) | 0.100 | | | | |
| 12 | Lens 6 | 1.349 | (ASP) | 0.696 | Plastic | 1.544 | 55.9 | −37.22 |
| 13 | | 1.034 | (ASP) | 0.700 | | | | |
| 14 | IR-cut filter | Plano | | 0.300 | Glass | 1.517 | 64.2 | — |
| 15 | | Plano | | 0.402 | | | | |
| 16 | Image | Plano | | — | | | | |

Note:
Reference wavelength is 587.6 nm (d-line).

TABLE 16

Aspheric Coefficients

| Surface # | 1 | 2 | 4 | 5 | 6 | 7 |
|---|---|---|---|---|---|---|
| k = | −1.6617E+00 | −9.0000E+01 | −5.6874E+00 | −9.0000E+01 | −7.3216E+00 | −8.5484E+00 |
| A4 = | −8.1975E−02 | −1.7193E−01 | −3.7971E−02 | −2.0263E−01 | −1.6569E−01 | −1.5303E−02 |
| A6 = | 2.6977E−02 | 1.0090E−01 | −2.9632E−02 | 1.2562E−01 | 1.6269E−01 | −9.6540E−03 |

TABLE 16-continued

| Aspheric Coefficients | | | | | |
|---|---|---|---|---|---|
| A8 = | −2.6561E−02 | −1.0030E−02 | 5.3013E−02 | −9.6117E−02 | 3.5609E−04 | 1.5490E−01 |
| A10 = | 3.9981E−02 | −1.4924E−02 | −8.9578E−02 | −4.4668E−02 | −1.1779E−01 | −2.0330E−01 |
| A12 = | −2.3792E−02 | — | — | 6.7472E−02 | 5.9281E−02 | 9.8937E−02 |
| A14 = | 3.4854E−03 | — | — | −3.6385E−02 | −4.4587E−05 | −2.1189E−02 |

| Surface # | 8 | 9 | 10 | 11 | 12 | 13 |
|---|---|---|---|---|---|---|
| k = | 1.2307E+01 | 1.5679E−01 | −3.0851E+00 | −3.5699E−01 | −4.1377E+00 | −3.1823E+00 |
| A4 = | −8.9691E−02 | −3.2237E−02 | −1.3538E−01 | 9.5163E−02 | −1.4129E−01 | −8.2154E−02 |
| A6 = | 2.7782E−02 | 4.7044E−03 | −3.5664E−02 | −3.0821E−02 | 5.5091E−02 | 3.0510E−02 |
| A8 = | −2.5297E−02 | 3.2704E−02 | 1.3880E−01 | 7.4932E−03 | −3.8222E−02 | −1.0202E−02 |
| A10 = | −1.1095E−02 | 2.5719E−02 | −4.1377E−02 | 1.0090E−02 | 2.0929E−02 | 2.4336E−03 |
| A12 = | 5.6803E−03 | −1.2039E−02 | −1.0843E−02 | −1.3705E−03 | −6.0245E−03 | −3.6630E−04 |
| A14 = | 6.7531E−02 | −2.5177E−03 | 3.2357E−06 | −2.1171E−03 | 8.1686E−04 | 2.9323E−05 |
| A16 = | −4.6265E−02 | — | −1.2250E−03 | 6.1003E−04 | −4.1758E−05 | −9.4171E−07 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 3.47 | (R3 + R4)/(R3 − R4) | −1.64 |
| Fno | 2.20 | (R5 + R6)/(R5 − R6) | 468.14 |
| HFOV [deg.] | 39.9 | (R9 − R10)/(R9 + R10) | −0.26 |
| Nmax | 1.661 | f2/f1 | −0.003 |
| V5 | 20.4 | \|f/f1\| + \|f/f6\| | 0.10 |
| (V3 + V5)/V2 | 0.78 | SD/TD | 0.89 |
| CT6/CT2 | 1.520 | TL/ImgH | 1.76 |
| f/R1 | 0.25 | TL [mm] | 5.29 |
| \|f/R1\| + \|f/R2\| | 0.51 | | |

The foregoing image capturing unit is able to be installed in, but not limited to, an electronic device, including smartphones, tablet personal computers and wearable devices. According to the present disclosure, the second lens element with positive refractive power is favorable for having sufficient focusing capability to capture the incident light at the off-axial region, and thereby enlarging the field of view. The fifth lens element with negative refractive power is favorable for correcting the distortion of the off-axial field and the Petzval sum of the photographing lens system so as to improve the flatness of the image surface, and thereby improving the image quality at the off-axial region. The image-side surface of the sixth lens element is concave so that it is favorable for correcting aberrations of the off-axial field so as to further improve the image quality. When specific condition is satisfied, the curvature of the object-side surface of the first lens element is favorable for reducing a change in direction of the incident light due to refraction so as to prevent severe aberrations. Furthermore, it is favorable for balancing the refractive power distribution at the object side and the image side so as to reduce the total track length in the photographing lens system and enlarge the field of view. Moreover, it is favorable for arranging the incident light path and correcting astigmatism of the second lens element. According to the present disclosure, the photographing lens system satisfies the requirements of compact size, wide field of view and high image quality simultaneously.

The foregoing description, for the purpose of explanation, has been described with reference to specific embodiments. It is to be noted that TABLES 1-16 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing lens system comprising, in order from an object side to an image side:
   a first lens element;
   a second lens element having positive refractive power;
   a third lens element having an image-side surface being concave, wherein both an object-side surface and the image-side surface of the third lens element are aspheric;
   a fourth lens element having an image-side surface being convex, wherein both an object-side surface and the image-side surface of the fourth lens element are aspheric;
   a fifth lens element having negative refractive power, wherein both an object-side surface and an image-side surface of the fifth lens element are aspheric; and
   a sixth lens element having an image-side surface being concave, wherein both an object-side surface and the image-side surface of the sixth lens element are aspheric, and at least one of the object-side surface and the image-side surface of the sixth lens element has at least one inflection point;
   wherein the photographing lens system has a total of six lens elements; a focal length of the photographing lens system is f, a focal length of the first lens element is f1, a focal length of the second lens element is f2, a curvature radius of an object-side surface of the first lens element is R1, a central thickness of the second lens element is CT2, a central thickness of the sixth lens element is CT6, and the following conditions are satisfied:

$0.80 < CT6/CT2$;

$-0.60 \leq f/R1 < 0.80$; and $-0.50 \leq f2/f1 < 0.40$.

2. The photographing lens system of claim 1, wherein the third lens element has negative refractive power.

3. The photographing lens system of claim 1, wherein the second lens element has an object-side surface being convex.

4. The photographing lens system of claim 1, wherein the object-side surface of the fourth lens element is concave.

5. The photographing lens system of claim 1, further comprising an aperture stop, wherein there is an air gap in a paraxial region between every two lens elements of the photographing lens system that are adjacent to each other, an axial distance between the aperture stop and the image-side surface of the sixth lens element is SD, an axial distance between the object-side surface of the first lens element and the image-side surface of the sixth lens element is TD, and the following condition is satisfied:

$0.70 < SD/TD < 1.10$.

6. The photographing lens system of claim 1, wherein the focal length of the photographing lens system is f, the curvature radius of the object-side surface of the first lens element is R1, a curvature radius of an image-side surface of the first lens element is R2, and the following condition is satisfied:

$|f/R1|+|f/R2|<1.10$.

7. The photographing lens system of claim 1, wherein an Abbe number of the second lens element is V2, an Abbe number of the third lens element is V3, an Abbe number of the fifth lens element is V5, and the following condition is satisfied:

$(V3+V5)/V2<1.0$.

8. The photographing lens system of claim 1, wherein the focal length of the photographing lens system is f, the curvature radius of the object-side surface of the first lens element is R1, and the following condition is satisfied:

$-0.50<f/R1<0.50$.

9. The photographing lens system of claim 1, wherein half of a maximal field of view of the photographing lens system is HFOV, and the following condition is satisfied:

38.0 degrees<HFOV<48.0 degrees.

10. A photographing lens system comprising, in order from an object side to an image side:
a first lens element;
a second lens element having positive refractive power;
a third lens element having an object-side surface and an image-side surface being both aspheric;
a fourth lens element having an object-side surface being concave, wherein the object-side surface and an image-side surface of the fourth lens element are both aspheric;
a fifth lens element with negative refractive power having an object-side surface being concave and an image-side surface being convex, wherein both the object-side surface and the image-side surface of the fifth lens element are aspheric; and
a sixth lens element having an image-side surface being concave, wherein both an object-side surface and the image-side surface of the sixth lens element are aspheric, and at least one of the object-side surface and the image-side surface of the sixth lens element has at least one inflection point;
wherein the photographing lens system has a total of six lens elements; a focal length of the photographing lens system is f, a focal length of the first lens element is f1, a focal length of the second lens element is f2, a curvature radius of an object-side surface of the first lens element is R1, and the following conditions are satisfied:

$-0.60<f/R1<0.80$; and $-0.50<f2/f1<0.40$.

11. The photographing lens system of claim 10, wherein the second lens element has an object-side surface being convex, and the object-side surface of the sixth lens element is convex.

12. The photographing lens system of claim 10, wherein the fourth lens element has positive refractive power.

13. The photographing lens system of claim 10, wherein at least one of the object-side surface and an image-side surface of the first lens element has at least one inflection point.

14. The photographing lens system of claim 10, wherein an Abbe number of the fifth lens element is V5, and the following condition is satisfied:

$V5<35.0$.

15. The photographing lens system of claim 10, wherein there is an air gap in a paraxial region between every two lens elements of the photographing lens system that are adjacent to each other, an axial distance between the object-side surface of the first lens element and an image surface is TL, a maximum image height of the photographing lens system is ImgH, and the following condition is satisfied:

$TL/ImgH<1.80$.

16. The photographing lens system of claim 10, wherein a curvature radius of the object-side surface of the fifth lens element is R9, a curvature radius of the image-side surface of the fifth lens element is R10, and the following condition is satisfied:

$-0.4<(R9-R10)/(R9+R10)<0$.

17. The photographing lens system of claim 10, wherein the focal length of the photographing lens system is f, the focal length of the first lens element is f1, a focal length of the sixth lens element is f6, and the following condition is satisfied:

$|f/f1|+|f/f6|<0.50$.

18. The photographing lens system of claim 10, wherein an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, an axial distance between the fifth lens element and the sixth lens element is T56, and the following conditions are satisfied:

$T23<T12<T34$;

$T23<T12<T45$;

$T56<T12<T34$; and $T56<T12<T45$.

19. A photographing lens system comprising, in order from an object side to an image side:
a first lens element;
a second lens element having positive refractive power;

a third lens element having an image-side surface being concave, wherein both an object-side surface and the image-side surface of the third lens element are aspheric;

a fourth lens element having an object-side surface and an image-side surface being both aspheric;

a fifth lens element having negative refractive power, wherein both an object-side surface and an image-side surface of the fifth lens element are aspheric; and a sixth lens element having an image-side surface being concave, wherein both an object-side surface and the image-side surface of the sixth lens element are aspheric, and at least one of the object-side surface and the image-side surface of the sixth lens element has at least one inflection point;

wherein the photographing lens system has a total of six lens elements; a focal length of the photographing lens system is f, a focal length of the first lens element is f1, a focal length of the second lens element is f2, a curvature radius of an object-side surface of the first lens element is R1, a curvature radius of the object-side surface of the third lens element is R5, a curvature radius of the image-side surface of the third lens element is R6, and the following conditions are satisfied:

$-0.60 < f/R1 < 0.80;$ $-0.50 < f2/f1 < 0.40;$ and $1.0 < (R5+R6)/(R5-R6).$

20. The photographing lens system of claim 19, wherein the focal length of the photographing lens system is f, the curvature radius of the object-side surface of the first lens element is R1, a curvature radius of an image-side surface of the first lens element is R2, and the following condition is satisfied:

$|f/R1|+|f/R2|<1.10.$

21. The photographing lens system of claim 19, wherein the focal length of the first lens element is f1, the focal length of the second lens element is f2, and the following condition is satisfied:

$-0.30 < f2/f1 < 0.25.$

22. The photographing lens system of claim 19, wherein a curvature radius of an object-side surface of the second lens element is R3, a curvature radius of an image-side surface of the second lens element is R4, and the following condition is satisfied:

$(R3+R4)/(R3-R4)<0.$

23. The photographing lens system of claim 19, wherein a central thickness of the second lens element is CT2, a central thickness of the sixth lens element is CT6, and the following condition is satisfied:

$0.80 < CT6/CT2.$

24. The photographing lens system of claim 19, wherein all lens elements of the photographing lens system are made of plastic materials; a maximum refractive index among the lens elements of the photographing lens system is Nmax, an axial distance between the object-side surface of the first lens element and an image surface is TL, and the following conditions are satisfied:

$Nmax<1.70;$ and $TL<8.0$ millimeters.

25. The photographing lens system of claim 19, wherein the second lens element has strongest refractive power among the lens elements of the photographing lens system.

26. An image capturing unit, comprising:
the photographing lens system of claim 19; and
an image sensor, wherein the image sensor is disposed on the image side of the photographing lens system.

27. An electronic device, comprising:
the image capturing unit of claim 26.

* * * * *